(12) United States Patent
Trivedi et al.

(10) Patent No.: US 11,851,352 B2
(45) Date of Patent: Dec. 26, 2023

(54) BIOMASS SELECTION AND CONTROL FOR CONTINUOUS FLOW GRANULAR/FLOCCULENT ACTIVATED SLUDGE PROCESSES

(71) Applicant: Ovivo Inc., Montreal (CA)

(72) Inventors: Hiren Trivedi, Cedar Park, TX (US); John Vorwaller, Salt Lake City, UT (US); Tyson Beaman, Murray, UT (US); Sophia Baker, Ogden, UT (US); Sergio Pino-Jelcic, Salt Lake City, UT (US); David Stensel, Mercer Island, WA (US)

(73) Assignee: Ovivo Inc., Montreal (CA)

( * ) Notice: Subject to any disclaimer, the term of this patent is extended or adjusted under 35 U.S.C. 154(b) by 173 days.

(21) Appl. No.: 17/445,558

(22) Filed: Aug. 20, 2021

(65) Prior Publication Data

US 2021/0380443 A1   Dec. 9, 2021

Related U.S. Application Data

(60) Division of application No. 17/027,528, filed on Sep. 21, 2020, now Pat. No. 11,161,760, which is a (Continued)

(51) Int. Cl.
*C02F 1/52* (2023.01)
*C02F 3/02* (2023.01)
*C02F 1/00* (2023.01)

(52) U.S. Cl.
CPC ............... *C02F 1/52* (2013.01); *C02F 3/02* (2013.01); *C02F 2001/007* (2013.01); *C02F 2301/046* (2013.01)

(58) Field of Classification Search
CPC .......... C02F 3/121; C02F 3/1221; C02F 3/30; C02F 3/286; C02F 3/12
(Continued)

(56) References Cited

U.S. PATENT DOCUMENTS

| 4,039,428 A | 8/1977 | Wei |
| 4,273,658 A | 6/1981 | Karman |

(Continued)

FOREIGN PATENT DOCUMENTS

| CN | 208594078 | 3/2019 |
| EP | 1634855 | 3/2006 |

(Continued)

OTHER PUBLICATIONS

Figdore, B.A. et al., "Comparison of Different Aerobic Granular Sludge Types for Preferred Bioaugmentation of Activated Sludge Nitrification", Bioresource Technology 251, 2018, pp. 189-196, Elsevier Ltd.

(Continued)

*Primary Examiner* — Claire A Norris
(74) *Attorney, Agent, or Firm* — Thomas M. Freiburger

(57) ABSTRACT

A continuous flow granular/flocculent sludge wastewater process selects for granule biomass capable of nitrogen and phosphorus removal and controls granule size and concentration of granular and flocculent sludge for optimal nutrient, organic, and solids removal in a smaller footprint. A series of biological process zones lead to a secondary clarifier. Mixed liquor sludge, preferably from an aerobic zone, goes through a classifier or separator processing flow from the aerobic zone, to the secondary clarifier. In a sidestream process that can be included a portion of sludge preferably from an aerobic zone goes through a classifier or separator to selectively produce a granular-rich effluent, and the clarifier may also have a separator to further concentrate
(Continued)

granular biomass, most of which is cycled back to an initial multi-stage anaerobic process zone. The anaerobic zone is structured and operated to encourage growth of granules in subsequent process zones.

8 Claims, 11 Drawing Sheets

Related U.S. Application Data continuation-in-part of application No. 16/537,379, filed on Aug. 9, 2019, now Pat. No. 10,781,125.

(60) Provisional application No. 62/718,313, filed on Aug. 13, 2018.

(58) Field of Classification Search
USPC .................................... 210/194, 616, 723
See application file for complete search history.

(56) References Cited

U.S. PATENT DOCUMENTS

| | | | |
|---|---|---|---|
| 5,601,704 | A | 2/1997 | Salem et al. |
| 5,985,150 | A | 11/1999 | Versprille et al. |
| 6,566,119 | B1 | 5/2003 | Heijnen et al. |
| 6,712,970 | B1 | 3/2004 | Trivedi |
| 6,793,822 | B2 | 9/2004 | Tay et al. |
| 7,060,185 | B2 | 6/2006 | Kim et al. |
| 7,273,553 | B2 | 9/2007 | Van Loosdrecht et al. |
| 7,459,076 | B2 | 12/2008 | Cote et al. |
| 8,409,440 | B2 | 4/2013 | Baron et al. |
| 9,242,882 | B2 | 1/2016 | Nyhuis et al. |
| 9,758,405 | B2 | 9/2017 | Peeters |
| 10,781,125 | B2 | 9/2020 | Stensel |
| 2004/0020847 | A1 | 2/2004 | Wright |
| 2006/0278578 | A1 | 12/2006 | Dornfeld |
| 2014/0083936 | A1 | 3/2014 | Murthy et al. |
| 2015/0376043 | A1* | 12/2015 | Wett .......................... C02F 3/28 210/601 |
| 2016/0137537 | A1 | 5/2016 | Bott et al. |
| 2018/0230034 | A1 | 8/2018 | Horjus |
| 2020/0002201 | A1 | 1/2020 | Stinson et al. |

FOREIGN PATENT DOCUMENTS

| | | |
|---|---|---|
| GB | 1516673 | 7/1978 |
| GB | 2396348 | 6/2004 |
| JP | H05185100 | 7/1993 |
| NL | 2015286 | 2/2017 |
| WO | 2008141413 | 11/2008 |
| WO | 2013151434 | 10/2013 |
| WO | 2014047459 | 3/2014 |
| WO | 2017025345 | 2/2017 |
| WO | 2017218239 | 12/2017 |
| WO | 2019195918 | 10/2019 |
| WO | 2020036832 | 2/2020 |

OTHER PUBLICATIONS

Figdore, B.A. et al., "Bioaugmentation of Sidestream Nitrifying-Denitrifying Phosphorus-Accumulating Granules in a Low-SRT Activated Sludge System at Low Temperature", Water Research 135, 2018, pp. 24-250, Elsevier Ltd.

* cited by examiner

BIOMASS SELECTION AND CONTROL FOR CONTINUOUS FLOW GRANULAR/FLOCCULENT ACTIVATED SLUDGE PROCESSES

This application is a division of application Ser. No. 17/027,528, filed Sep. 21, 2020, now U.S. Pat. No. 11,161,760, issued Nov. 2, 2021, which is a continuation-in-part of application Ser. No. 16/537,379, filed Aug. 9, 2019, now U.S. Pat. No. 10,781,125, issued Sep. 22, 2020, which claimed benefit of provisional application No. 62/718,313, filed Aug. 13, 2018.

BACKGROUND OF THE INVENTION

The application involves reactor process configurations and a granular sludge classifier (separator) process to control granular sludge size and relative fractions of granular and flocculent activated sludge in a combined continuous flow wastewater treatment system for biological nutrient removal.

The activated sludge process has been used since the early 1900s for the treatment of domestic and industrial wastewater by microorganisms. The basic features of the traditional process are 1) mixing and aeration of the wastewater in a reactor with a flocculent mass containing active microorganisms and influent particulates, 2) a liquid/solids separation step to separate and discharge the treated effluent from the flocculent mass, 3) wasting of excess mass produced from removal of wastewater particulates and biomass growth from the removal of influent substances, 4) return of settled flocculent mass from an external liquid/solids separation step to the bioreactor or use of the settled flocculent mass in the bioreactor for continuous or batch treatment of wastewater.

The process was first developed as a batch treatment process in which the above steps of biological contact, liquid/solids separation, and flocculent mass return are done in a single tank. Continuous flow versions of the process followed soon after and are the most common version used today. Continuous flow activated sludge treatment involves single or multiple bioreactors used in series and an external liquid-solids separation step with recycle of the solids to the bioreactors. The process may involve the use of configurations with anaerobic, anoxic, and aerobic zones to meet treatment objectives. Gravity settling of solids in a clarifier is the most common liquid-solids separation method. The clarifier also provides high removal efficiency of suspended solids to produce a relatively clear effluent low in suspended solids. Due to excess sludge production, a waste solids stream routinely removes solids from the system to control the bioreactor mixed liquor suspended solids (MLSS) concentration.

The traditional activated sludge process has a flocculent biomass that in addition to consuming waste provides capture of particulate and fine solids to produce an effluent from the liquid/solids separation process that is low total suspended solids (TSS). The flocculent biomass has a very diffused structure and a floc size commonly from 0.05-0.30 mm (FIG. 1).

Flocculent biomass is created by production of extracellular polymeric substances during biomass growth which binds other bacteria and also traps and contains colloidal and suspended particulates from the influent wastewater. Biomass growth in aerobic activated sludge processes is the result of assimilation and oxidation of influent organic substrate with a suitable electron acceptor such as oxygen, nitrate, or nitrite. Biomass growth can also occur from oxidation of inorganic substrates such as ammonia, nitrite, reduced sulfur compounds, and reduced iron with a suitable electron acceptor. For the latter, the carbon needed for biomass growth is derived from carbon dioxide.

The wastewater organic concentration is commonly measured in a batch bioassay using bacteria and is referred to as the BOD or biochemical oxygen demand concentration. Treatment discharge standards require that the effluent BOD is below some specified value, typically 20 mg/L. The effluent BOD consists of soluble organic biodegradable substrate and biodegradable colloidal and particulate solids. Treatment discharge standards also require a low effluent total suspended solids (TSS) with values typically 20 mg/L. More stringent treatment requirements are often required with effluent BOD and TSS concentrations 10 mg/L. The physical characteristics of flocculent activated sludge is effective in capturing free bacteria, and nondegraded colloidal and particulate solids to meet permit limits for effluent TSS.

Different process tank configurations or batch treatment operation modes are also used in activated sludge processes to provide biological nitrogen removal and/or enhanced biological phosphorus removal (EBPR) to achieve low effluent concentrations of phosphorus and nitrogen (Tchobanoglous et al., 2014). Effluent nitrogen soluble inorganic species are ammonia ($NH_3$), nitrate ($NO_3$), and nitrite ($NO_2$). The activated sludge processes are designed with special configurations, including anaerobic, anoxic, and aerobic zones and operational methods to select for bacteria with specialized metabolic capability important for nutrient removal. These processes include nitrification only, both nitrification and denitrification (ND), and enhanced biological phosphorus removal (EBPR). Nitrification is the biological oxidation of ammonia ($NH_3$) to nitrite ($NO_2$) by one group of autotrophic bacteria and then to nitrate ($NO_3$) by another group of autotrophic bacteria in the presence of dissolved oxygen (DO). Nitrogen removal by denitrification is done by heterotrophic bacteria that reduce $NO_3/NO_2$ to dinitrogen ($N_2$) gas during the oxidation of organic compounds in the absence of DO. Denitrification occurs in anoxic reactors. EBPR occurs in biological treatment due to the growth and wasting of bacteria that store high concentrations of phosphorus, which are referred to as phosphorus accumulating organisms (PAOs). The growth of PAOs requires contact of the PAOs with influent wastewater under anaerobic conditions followed by anoxic and/or aerobic conditions. The anaerobic reactor does not receive any significant amount of DO, $NO_3$ or $NO_2$. In the anaerobic contact zone acetate and propionate volatile fatty acids (VFAs) from the influent wastewater or produced by organic solids fermentation in the anaerobic contact zone are consumed by the PAOs and stored as polyhydroxyalkanoate compounds. Stored polyphosphates in the PAOs provides energy needed by the PAOs to take up carbon and convert to storage products. Phosphate is released from the PAOs to the reactor liquid during their polyphosphate use in the anaerobic zone. The PAOs oxidize their carbon storage products using $NO_3$ or $NO_2$ in an anoxic zone which results in nitrogen conversion and nitrogen removal from the wastewater. PAOs oxidize their carbon storage using oxygen in an aerobic zone. During their stored carbon oxidation in anoxic or aerobic zones the PAOs create energy which they store in polyphosphate deposits by taking up phosphate from the reactor liquid. Wasting of excess PAO biomass results in phosphorus removal from the system.

Nitrogen removal in continuous flow flocculent sludge systems have an anoxic process zone upstream of a nitrifying aerobic process zone. The anoxic zone receives organic substrate for denitrification from influent wastewater feed or in flow from an anaerobic contact zone with PAO activity. The anoxic reactor also receives $NO_3/NO_2$ in mixed liquor recycle from the downstream aerobic nitrifying reactor. Denitrifying bacteria oxidize the food in the anoxic reactor feed with reduction of $NO_3/NO_2$ to nitrogen gas for nitrogen removal. PAOs from the EBPR anaerobic contact zone are also able to oxidize their carbon storage with $NO_3$ or $NO_2$ in the anoxic zone to accomplish nitrogen removal.

More recently, it has been shown that activated sludge can be grown in a more compact approximate spherical self-formed biofilm layered structure in contrast to the more diffused flocculent activated sludge structure. These suspended biofilms are self-aggregating, do not require a carrier media and are referred to as granular activated sludge. Their size may be from 0.2 to 4.0 mm (Figdore et al., 2017). The structure of granular sludge is compared to flocculent sludge in FIG. 1. Due to the fact of the greater size, density, and smoother morphology, the granular sludge can settle 5 to 30 times faster than flocculent sludge and can be thickened to a much higher concentration in a short time. A system high in granular sludge content has a 5-minute sludge volume index (SVI) approaching that of the 30-minute SVI or a $SVI_5/SVI_{30}$ ratio near 1.0, due to the discrete particles and fast settling. The biomass concentration in a granular activated sludge treatment reactor can be 2 to 3 times that for flocculent sludge to result in much greater treatment ability or treatment capacity with less tank volume and lower footprint.

Granular biomass can be grown with ability for EBPR, nitrification, and denitrification (Figdore et al., 2018a). The granules that contain PAOs are more versatile and, if of sufficient size, can provide simultaneous nitrification and denitrification (SND) for nitrogen removal in an aerobic zone in addition to phosphorus removal.

In contrast to flocculent sludge with its smaller and diffuse structure, granular sludge can have a layered spatial distribution of key types of bacteria within different layers to provide unique phosphorus and nitrogen removal activity. The process configuration and classifier in this application provides such type of granular growth due to the nature of the granular growth conditions and granular size selection. FIG. 1 photomicrographs illustrate the magnitude of granule size and density and a simple representation of the spatial distribution of bacteria involved in biological phosphorus and nitrogen removal. DO and $NH_3$ from the bulk liquid is taken up at the granule outer layers rich in nitrifying bacteria. The $NO_3$ and $NO_2$ produced diffuses into the inner core of the granule that is rich in PAOs. The PAOs utilize the $NO_3$ and $NO_2$ for the oxidation of stored substrates with subsequent $NO_3$ and $NO_2$ reduction to $N_2$. The soluble phosphorus in the bulk liquid is also removed via diffusion and uptake by the PAOs. Due to the granule size all these reactions can occur in an aerated tank and thus the PAO granules can provide simultaneous nitrification-denitrification (SND) for nitrogen removal and phosphorus removal in the same tank. Nitrogen removal is accomplished in conventional flocculent sludge processes using separate anoxic and aerobic reactors with internal recycle. Advantages of a granule sludge system for nutrient removal are 1) an efficient use of influent soluble BOD, also measured as soluble biodegradable chemical oxygen demand (COD), for both EBPR and denitrification to accomplish phosphorus and nitrogen removal, and 2) denitrification in an aerobic zone which may eliminate the need for a separate anoxic zone and internal recycle pumping for nitrogen removal.

An anaerobic contact zone with soluble food is a required process condition to grow and sustain PAOs. When both granular sludge and flocculent sludge are recycled to an anaerobic contact zone the growth of granular sludge is inhibited. Flocculent sludge can also contain PAOs and can consume soluble biodegradable (bCOD) in the anaerobic contact zone faster than PAO-containing granular sludge because of diffusion limitations for the large and denser granular biomass. Soluble bCOD from the bulk liquid must diffuse into the depth of the granules which results in a lower soluble BOD concentration with increasing depth. Thus, the overall rate of soluble bCOD uptake in g soluble bCOD/g VSS-h is much slower for a granule than a floc because the uptake rate is proportional to the localized substrate concentration. The method in this disclosure calls for an anaerobic first reactor contact with wastewater feed at a high soluble bCOD volumetric loading and recycle of mostly granular biomass from the classifier as the first step, which thus minimizes competition for food from the flocculent biomass and instead allows more granular biomass growth and larger granules. Another method using an anoxic contact zone in the same manner also favors growth of granular biomass. Thus, the classifier that provides a granular sludge recycle to the high loaded first reactor works in tandem with the first reactor to select for granular sludge growth of a preferred size and function.

A disadvantage of granular biomass is that the granular structure is not as effective as flocculent biomass in capturing colloidal and suspended particles contained in the wastewater. Results from a granular activated sludge system consisting of biomass with over 90% granular sludge had an average effluent TSS concentration of 174 mg/L (Figdore et al., 2018b), which is well above wastewater treatment plant effluent permit TSS concentration limits of 10-30 mg/L. Capture of colloidal and suspended solids by flocculent sludge and removal in liquid-solids separation is necessary to minimize the effluent TSS concentration to meet effluent BOD and TSS treatment needs. A combined granular and flocculent activated sludge system as describe in this disclosure can produce the necessary effluent clarification needed to meet permit limits while also reducing treatment footprint requirement and providing nutrient removal.

Similar to the first flocculent activated sludge processes used, the development and application of granular activated sludge has been done with sequencing batch reactors (SBRs). SBRs involve a batch feeding, a reaction time, settling time, and effluent removal. The batch feeding time comprises about 25% of the SBR processing time and thus multiple SBRs must be operated in synchronization or influent wastewater storage is needed.

Most biological wastewater treatment processes currently installed in the United States and worldwide are continuous flow activated sludge processes. SBRs have much different influent wastewater feeding arrangements and generally use deeper tanks than for continuous flow activated sludge treatment systems. Process modifications that can convert continuous flow flocculent activated sludge treatment systems to a combined granular/flocculent activated sludge system and maintain the existing feeding and tank layout could provide many benefits including nutrient removal and increased treatment capacity.

Most existing patents involving granular activated sludge for wastewater treatment involve SBR technology. Others do not address the need for growth conditions that favor granular biomass growth with preferred types of bacteria over flocculent biomass growth to sustain a high level of granular biomass in the activated sludge process and they also do not address the relative concentrations of granules and flocculent sludge preferred for a combined granular/flocculent sludge process.

U.S. Pat. No. 6,566,119 relates to a sequencing batch reactor (SBR) operation producing aerobic granular activated sludge. A reactor is inoculated with aerobic microorganisms, fed a substrate under turbulent mixing conditions caused by sparging a gas containing oxygen, stopping the mixing for a time to allow settling of the aerobic microorganisms, and followed by removing liquid to empty the top part of the reactor and repeating the batch feeding, aeration, settling, and effluent withdrawal cycle. The settling time is based on the height of the liquid remaining in the reactor in meters divided by a velocity of at least 5 meters/hour.

U.S. Pat. No. 6,793,822 relates to an SBR operation producing aerobic biogranules. The operation involves adding wastewater into a reactor containing an active biomass sludge, providing an oxygen-containing gas at a superficial upflow gas velocity greater than 0.25 cm/second to provide oxygen for microbial uptake and to mix and suspend the biomass, initiating a period of nutrient starvation in the reactor will continuing to provide the oxygen-containing gas, allowing the formed aerobic granules to settle, and discharging and replacing at least a portion of the wastewater and subsequently repeating the operating cycle. The patent claims did not specify a settling time, but the description specified settling times of 1 to 20 minutes. The nutrient starvation time was estimated to be about 80% of the aeration period.

U.S. Pat. No. 7,273,553 relates to an SBR operation producing aerobic biogranules that remove nitrogen and phosphorus compounds in addition to organic substrates. The batch cycle consists of feeding wastewater into a granular sludge bed in the bottom of the reactor under anaerobic conditions, aeration and mixing the reactor contents with an oxygen-containing gas, and a settling step to allow separation of the upper liquid from the activated sludge. The process description specifies that the wastewater can be introduced into the settled bed without fluidization of the bed or if mixing is used to contact the wastewater and settled sludge the bottom mixed volume be limited to 25% of the reactor volume. The upflow velocity during batch feeding is not given and a settling time of 3 min was given in a process example in the patent description. Effluent withdrawal was given at 50% of the reactor height in the example but no specifications on the location of the effluent removal or effluent removal during feeding (as is now done in the process application) was given in the claims or example. This process operation provides an environment that favors the growth of granules containing PAOs as described above due to the feeding of wastewater to an anaerobic zone with settled granules and subsequently aerobic nitrification and denitrification reactions.

U.S. Pat. No. 8,409,440 describes another form of an SBR process using two compartments and with conditions to favor growth of granular biomass with phosphorus and nitrogen removal ability. Two reactor compartments that communicate with each other at the bottom are used. Batch charging of wastewater to the system is done by using a vacuum in the head space of compartment 1, which allows the intake of a batch feed without disturbing a settled granular sludge bed in compartment 2. The next step in the cycle is to open compartment 1 to atmospheric pressure, which results in compartment 2 receiving the batch feed from compartment 1. The feed is distributed across the reactor bottom area of compartment 2 to contact and fluidize the granular bed with the wastewater under anaerobic conditions. A series of batch feedings may follow. This is then followed by aeration and settling steps. A settling time of 5 minutes before effluent decanting was given in the patent description.

Sequencing batch reactor treatment processes that accomplish biological nutrient removal with a granular activated sludge have been identified. However most biological treatment processes for wastewater treatment are continuously fed systems with external clarifiers. The continuously-fed systems are preferred over SBR systems for moderate and larger size plants in view of economics, space requirements, and operational complexity. Conversion of existing continuously-fed systems to SBR systems for granular sludge selection may be difficult and not economically attractive in most cases in view of the arrangement of the existing tanks and the plant piping and hydraulics. The ability to convert existing facilities or design new facilities that develop granular activated sludge with biological nutrient removal is attractive in terms of the potential increase in plant capability and capacity provided by the dense granular biomass.

U.S. Pat. No. 5,985,150 relates to an aerobic activated sludge reactor with two zones and a separator in the second zone for continuous-flow treatment with granules. Oxygen containing gas in the second zone creates a recirculation of reactor contents between the second and first zones with downward velocity in the first zone created by the rising gas and higher liquid elevation in the second zone. The first zone also receives influent wastewater. Effluent is removed in a three-phase separator including release of gas released from the recirculation flow from the second zone to the first zone. The recirculated flow enters a chamber at the top of the first zone. Water flows out of the chamber and then upward through plate settlers at a velocity to allow the granular activated sludge to settle back to the first zone for recirculation. The treated effluent exits via the plate settler. An example of the process shows an upflow velocity of 14 meter/hour in the plate separator, which would carry out the lighter flocculent sludge and allow granular sludge with its higher settling velocity to be retained in the reactor.

U.S. Pat. No. 5,985,150 had no anaerobic contact zone to develop PAO granules and granules capable of SND, and no conditions to wash out flocculent sludge, and thus high effluent total suspended solids (TSS) would be expected for treatment of domestic and industrial wastewaters.

U.S. Pat. No. 7,060,185 relates to an apparatus for treating sewage using granulated sludge. The system has three tanks in series with recirculating flow from the last tank to the first tank. The first tank is described as an anaerobic granulation tank, the second in series is an indirect aeration tank and the third in series is referred to as an aerobic granulation tank. The anaerobic granulation tank receives flow at the bottom of the tank made up of influent wastewater and recycle from the aerobic granulation tank. The recycle from the aerobic granulation tank contains nitrate/nitrite due to the ammonia oxidation in the aerobic granulation tank. Phosphorus removing organisms contained in the granulated sludge use the recycled nitrate/nitrite for electron acceptors. The tank also contains an agitator and an upflow velocity of liquid results in a supernatant without granules that flows to the indirect aeration tank. Oxygen is dissolved at super saturated conditions in the indirect aeration tank. Flow from the indirect aeration tank provides dissolved oxygen for the final aerobic granulation tank. This flow is distributed in the bottom of the aerobic granulation tank and an agitator in the bed is also present. The upflow velocity carries supernatant without granules with part of it being discharged as treated effluent and the rest as recirculation flow to the anaerobic granulation tank. The liquid upflow velocity is claimed to be 1.3 to 1.7 meters/hour which would not be sufficient to suspend granules.

U.S. Pat. No. 7,060,185 involves indirect aeration which requires much higher energy than that used by conventional activated sludge aeration methods and involves a very high recycle of flow for aeration. The advantage claimed for the method is that it provides higher efficiency in removing nitrogen and phosphorus due to the microorganism selection, but does not claim to provide a higher biomass concentration in the reactors due to granular growth to increase reactor capacity. It is also a very complex system that cannot be easily adapted to existing continuous flow activated sludge systems.

U.S. Pat. No. 7,459,076 relates to a flow-through aerobic granulator reactor, which is intended to process continuous wastewater flow, select and sustain aerobic granular biomass, and accomplish biological nitrogen and phosphorus removal. The reactor may consist of three or four zones. The three-zone system has an anaerobic zone in which influent wastewater flows through a settled granular sludge bed, an aerobic or operationally an aerobic/anoxic zone, and a settling zone. The four-zone system has an anaerobic zone in which influent wastewater flows through a settled granular sludge bed, an anoxic zone that receives recirculated biomass from the aerobic zone and effluent from the anaerobic zone, and a settling zone. Airlift pumps periodically transfer solids from the anaerobic zone to the aerobic or anoxic zones. The settling zone, which has a series of settling plates, receives effluent flow at a high upward velocity (4 meters/hour or greater) to wash out lighter flocculent biomass with settling of the separated granules directed to the anaerobic zone.

U.S. Pat. No. 7,459,076 selects for only granular sludge and washes out flocculent sludge entirely. It provides influent feeding only through settled sludge. It may also be energy inefficient due to the need to depend on sufficient aeration air lift to accomplish recirculation of flow from the aerobic to anoxic zone. It also requires multiple air lift pumps to move granules from the anaerobic to the aerobic zone. Its physical arrangement of the zones would not be adaptable to many existing activated sludge systems.

U.S. Pat. No. 9,242,882 relates to a method used to waste excess sludge and select for heavier settling solids in an activated sludge process to improve the activated sludge settling characteristics as measured by the Sludge Volume Index (SVI). This is accomplished by passing the waste sludge stream through some type of gravimetric separator with the lighter solids wasted from the biological treatment system and the heavier solids returned to the biological process. The patent indicates that the gravimetric separator could be any process that selects and retains solids with superior settling properties. The patent describes the separator as receiving the process stream from the biological reactor, returning a stream from the separator with the solids with superior settling properties to the biological process, and wasting the remaining solids stream from the separator for sludge processing. An alternative approach described is feeding a stream from the bottom of the secondary effluent clarifier to the separator and feeding the separated heavier solids to the biological process and wasting the stream with the lighter solids. The process description states that the gravimetric separator devices include a settling tank, a settling column, cyclone, hydrocyclone, and centrifuge as examples of apparatus in this application.

U.S. Pat. No. 9,242,882 is not used in the treatment system process and only relates to handling the smaller waste activated sludge stream with wasting of lighter solids from the waste sludge. It does not address the ability to provide process conditions that favor the growth of granular biomass over flocculent biomass. Lack of or poor growth conditions for granular sludge will limit the ability to sustain granular sludge and the reactor mixed liquor solids concentration attainable.

U.S. Pat. No. 9,758,405 relates to a parallel operation of a conventional flocculent activated sludge process and a SBR granular activated sludge process with influent flow split to the two processes. The flocculent activated sludge process handles hydraulic variations in influent flow, while the parallel granular sludge SBR is operated with controlled batch feed in the same way as described in U.S. Pat. No. 7,273,553 for production of PAO-containing granules. In this way the practical problem of variations in influent flow rates are handled by the existing flocculent activated sludge process by having continuous flow gravity separation final clarifiers for separation of treated effluent and return of thickened activated sludge to the process. The parallel granular sludge SBR system provides additional wastewater treatment capacity and is also intended to increase the biomass concentration and capacity of the parallel flocculent activated sludge system by wasting excess granular sludge produced to the flocculent activated sludge system. The average particle size of the granular sludge wasted to the flocculent activated sludge system is stated in the patent to be less than the average size of the granules in the SBR system but greater than the activated sludge floc in the flocculent activated sludge system.

U.S. Pat. No. 9,758,405 does not provide a means for assuring the growth and retention of the PAO granular sludge added from the sidestream batch reactor to the parallel activated sludge reactor. There is not necessarily an influent wastewater/activated sludge contact zone for growth of PAO granules or other type of zones to favor substrate uptake by granules over flocculent biomass. In addition, the solids retention time of the granules added to the continuous flow flocculent activated sludge process would be the same as for the flocculent sludge. Thus, it only provides a marginal benefit in the performance of the parallel activated sludge process.

SUMMARY OF THE INVENTION

A method is provided for a continuous flow combined granular and flocculent activated sludge wastewater treatment process to remove organics, particulates, nitrogen, and phosphorus to low effluent concentrations with a smaller footprint than the traditional flocculent activated sludge process. The process selects for granule biomass capable of phosphorus and nitrogen removal and controls the average size of the granular sludge and the granular and flocculent sludge concentrations and solids retention times (SRTs).

The method comprises feeding influent wastewater to the first reactor of an anaerobic process zone at a soluble BOD volumetric loading rate of equal to or greater than 0.20 g soluble bCOD per liter per day, which also receives recycle of granular sludge from a granular sludge classifier, sometimes called separator herein, with the continuous flow treatment system. The anaerobic process is followed by an aerobic process and then mixed liquor flow from the aerobic process flows through a granular sludge classifier at a desired hydraulic loading to control the granule separation from the flocculent sludge at the desired granular size.

Flocculent sludge and smaller granules are contained in the flow from the classifier to the secondary clarifier. The flocculent sludge and other particulates settled to the bottom of the secondary clarifier and the clarifier effluent flow has a low TSS concentration, which enables the system to meet effluent treatment needs. Flow from the bottom of the classifier containing mainly granular sludge is recycled to the first mixed reactor of the anaerobic process zone. The underflow of the secondary clarifier which contains mostly flocculent sludge and a much lesser amount of granular sludge is recycled to the aerobic process zone. Some portion of the secondary clarifier underflow is wasted from the system to control the solids retention time (SRT) and concentration of flocculent sludge in the aerobic process zone. Some portion of the classifier underflow can also be removed to wasting for control of the system granular sludge concentration and SRT. The first reactor in the anaerobic process zone may be followed by one or more additional anaerobic reactors in series. The aerobic process may consist of one or more aerated mixed reactors in series. DO control is used to set a DO target concentration in at least the first aerobic zone reactor for simultaneous nitrification and denitrification and phosphorus uptake by the granule biomass. The DO concentration setting allows the outside layers of granules to be aerobic with nitrification and a large enough anoxic inner granule volume to allow for denitrification by the PAOs. Control of the flow rate and liquid velocity in the classifier within a desired range for granule size selection is enabled by a bypass flow from the aerobic process zone around the classifier to the secondary clarifier in the case of high influent flow. In the case of low influent flow the flow rate to the classifier remains at the desired level by recycle flow of the classifier effluent to the classifier inlet and/or by recycle flow from the secondary clarifier underflow return sludge line.

The method may be a modification of the method described above by having an anoxic process zone between the anaerobic process zones and the aerobic process zone. The first reactor in the anoxic process zone receives flow from the last reactor in the anaerobic process zone and mixed liquor recycle flow from the aerobic process zone, which contains $NO_3/NO_2$. The anoxic process zone may consist of one or more mixed reactors in series.

The method may consist of an anoxic and aerobic process configuration to provide nitrogen removal without EBPR. This method involves feeding influent wastewater at a volumetric loading rate equal to or greater than 0.20 g soluble biodegradable COD per liter per day to a first mixed reactor in an anoxic process zone, with the anoxic process zone followed by an aerobic process and then mixed liquor flow from the aerobic process through a granular sludge classifier at an desired upflow velocity to control the desired granular size. The classifier effluent flows to a gravity secondary clarifier for effluent clarification and settled solids removal. Flow from the bottom of the classifier containing mainly granular sludge is recycled to the first reactor of the anoxic process some. The underflow of the secondary clarifier which contains mostly flocculent sludge and a much lesser amount of granular sludge is recycled to the aerobic process zone. Some portion of the secondary clarifier underflow is wasted from the system to control the flocculent sludge concentration in the aerobic process zone. Some portion of the classifier underflow can also be removed to wasting to control the granular biomass concentration and SRT in the anaerobic and aerobic process zones. The first reactor in the anoxic process zone may be followed by one or more additional anoxic reactors in series. The aerobic process may consist of one or more aerated mixed reactors with DO control in at least the first reactor to allow for simultaneous nitrification and denitrification. The flow rate to the classifier is also controlled in the same way as above to enable the selection of granular sludge within a desired size range.

The methods may comprise having two or more anaerobic reactors in series in the anaerobic process zone that are operated with the ability to turn off mixers over long time intervals to allow granules and solids to settle into a bottom sludge layer for fermentation to generate VFAs at high concentration for consumption by PAOs. The mixers would be turned on for a few minutes after off periods of 12 hours or more of to release the solids for movement to the next tank. This anaerobic reactor may also receive a portion of the secondary clarifier recycle sludge flow to provide additional organic material for fermentation. The localized high VFA concentration around the settled granular sludge provides a higher bulk liquid soluble bCOD concentration to drive substrate at sufficient depth to generate larger granular size.

The methods may include adding an exogenous source of soluble bCOD to support sufficient PAO growth or denitrification rates. For system low in feed soluble bCOD external sources of VFA or other bCOD may be added or process operation can be modified to produce VFAs. Common sources would be from a side reactor fermentation of waste primary sludge or purchase of industrial carbon such as glycerol, ethanol and acetate.

The methods may include having two or more anoxic reactors in series with a high soluble bCOD load to the first anoxic reactor receiving the classifier granule recycle stream and the influent wastewater.

The methods may include upflow or downflow granular sludge classifier designs that are located between the bioprocess and secondary clarifier.

The methods may include upflow or downflow granular sludge classifier designs that are located in the final tank of the bioprocess.

The methods may include upflow or downflow granular sludge classifier designs that are located in the secondary clarifier.

The methods may include a radial flow energy dissipator and flow distributor apparatus located in a granular sludge classifier.

The methods may include a downflow energy dissipator and flow distributor apparatus locate in a granular sludge classifier.

The methods may include designs for the energy dissipator that disrupt the granule/floc sludge matrix to free granules and floc.

The granular sludge must be of sufficient size to meet a high SND efficiency so that the outer aerobic fraction of the granule is not a large fraction of the granule biomass and the inner anoxic zone is large enough for the necessary anoxic PAO population and bioreactions. The size of the granular sludge also affects the sludge settling and thickening properties. As the granular size becomes larger the granular sludge settles faster and thickens better and is more capable of SND. However, if the size is too large the biomass is used less efficiently for ammonia and nitrogen removal. Larger granules have less surface area per mass and thus less area for growth of nitrifying bacteria growth. If too large there is a lower nitrification and nitrogen removal efficiency. A proper size range provides both good granule sludge separation and selection and good nitrification and nitrogen removal efficiency.

Results reported for a SBR pilot plant provided information on factors that affect the granular size and SND efficiency. The reactor was 8 ft high, 1 ft diameter and treated a stream rich in $NH_3$—N with acetate addition for PAO growth. It was operated with a 1-hour anaerobic contact time with acetate addition, 4.5 hour aerobic condition at a DO of about 2.0 mg/L and short settling and decant times. Change in settling time provided information on the needed settling velocity of the granules to remain in the system and the size of granules obtained for these settling velocities. As shown in FIG. 2, granule sizes above 0.80 mm were sufficient to have a settling velocity of 11.2 m/h. This is much higher than the typical settling velocity of 0.5-1.0 m/h for flocculent sludge.

As the acetate feed loading was increased the average granule size increased and the SND efficiency increased to 85-99% for nitrogen removal. At a soluble bCOD loading above 0.3-0.4 g/L-h, the granule size increased to a range of 0.95 to 1.1 mm. At higher soluble bCOD loadings the bulk liquid soluble bCOD concentration is higher and soluble bCOD diffuses deeper into the granular depth for PAO assimilation and growth to thus produce larger size granules. Thus, a high loading is needed to favor granule growth at 1.0 mm size and greater.

Results showed that the 1.0-1.2 mm size range provided sufficient surface area for nitrification at a reactor loading of >0.40 g $NH_3$—N/L-d and high granular sludge settling velocity. The effect of the organic loading and settling velocity for granule selection is an important feature of the activated sludge process configuration and classifier operation.

A prototype pilot upflow hydraulic classifier was tested for the separation of a granular/floc sludge mixture. The activated sludge and granules were grown on two different wastewater sources and reactors at a municipal wastewater treatment plant. The amount of granules available allowed a test feed concentration of 1300 mg/L as granular sludge and granule 800 mg/L for the flocculent sludge. The $SVI_{30}$ of the granule and flocculent sludge were 35 and 210 mL/g, respectively. The average granule size was 1.1 mm.

The classifier (separator) operating conditions provided an upflow velocity of 10.8 m/h. The classifier underflow contained 94% of the granules fed for a 6% rejection to the stream and 36% of floc for a 64% rejection to the stream. Such a stream in the continuous flow process described in this disclosure would go to a secondary clarifier.

A mass balance analyses was done to determine the relative concentrations and SRTs of granules and flocculent sludge in the bioprocess as a function of the granular sludge classifier performance and all solids wasting from the secondary clarifier underflow. The mass balance is based on three key fundamentals found in the wastewater engineering textbook by Tchobanoglous et al. (2014): 1) the solids concentration in a bioprocess is equal to the solids production rate times the solids SRT divided by the bioprocess volume, 2) at steady state operation the solids production rate is equal to the solids wasting rate, and 3) the SRT of the solids is equal to the solids mass in the bioprocess divided by the amount of solids wasted per day. This mass balance was done separately for granular and flocculent sludge. The relative amounts of each wasted is proportional to their relative concentrations leaving the granular sludge classifier. For example, if the effluent from the classifier contains 90% of the flocculent sludge and 10% of the granular sludge fed to the classifier, then the bioprocess will have the reverse concentrations of 90% granular sludge and 10% flocculent sludge. Results of this mass balance are shown in FIG. 3, which shows a graph of the granular to floc SRT ratio as a function of the classifier reject percentages.

The graph results in FIG. 3. are used to assess the efficiency of the classifier (separator) test result and show very acceptable and good performance the upflow classifier design and operation. At a 10% granular sludge reject and 65% reject for flocculent sludge, the system SRT for the granules is 6.5 times that of the flocculent sludge. Thus, if the flocculent sludge MLSS concentration is 1,200 mg/L for good clarification the granular sludge MLSS concentration could be as high as 7,800 mg/L. The combined flocculent/granular sludge concentration could then be 9,000 mg/L, which is about 3 times higher than used for conventional activated sludge processes for biological nutrient removal. Higher reject efficiencies lead to higher granular mixed liquor to floc mixed liquor concentrations.

In one particular embodiment of the invention a sidestream takes a portion of sludge from an aerobic zone of the system, the sidestream including a classifier or separator for producing an effluent with an increased concentration of granular biomass. Another effluent of this separator is rich in floc, and much of this is wasted. The granule-rich sludge goes to a clarifier, which may include a second separator within the clarifier, for further concentration of granules.

The anaerobic process zone preferably has multiple stages and is configured and operated to encourage solution growth of granular biomass in subsequent process zones.

DESCRIPTION OF PREFERRED EMBODIMENTS

Figure 1:
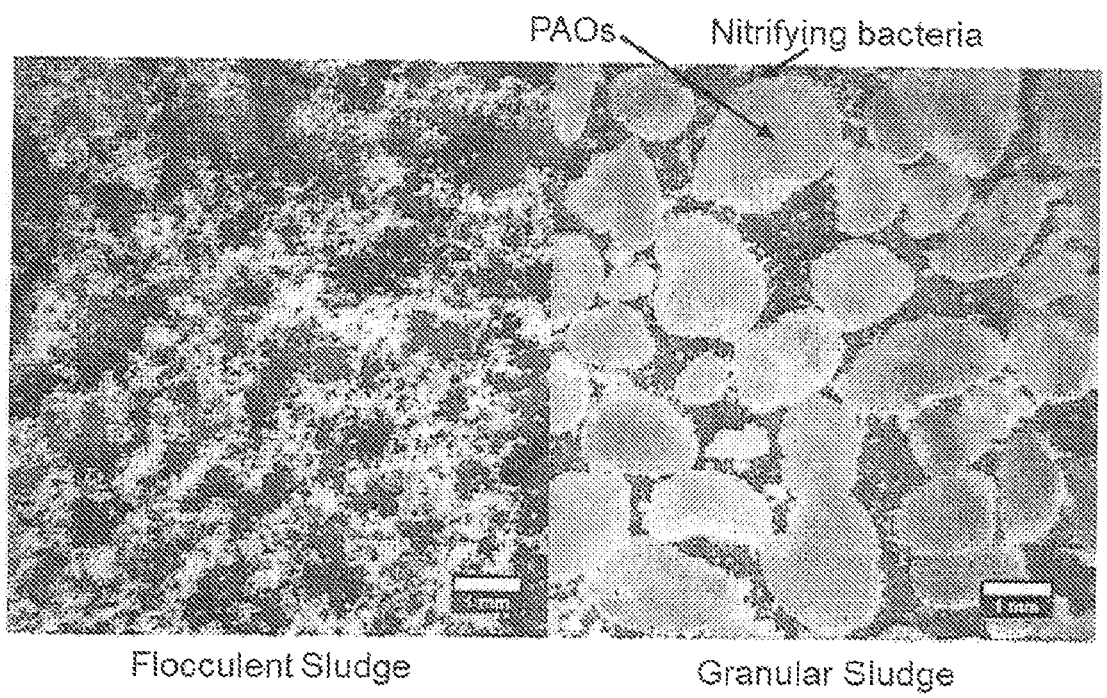
FIG. 1 shows stereo microscope photos comparing flocculent and self-aggregating aerobic granular sludge size and structure.
Figure 2:
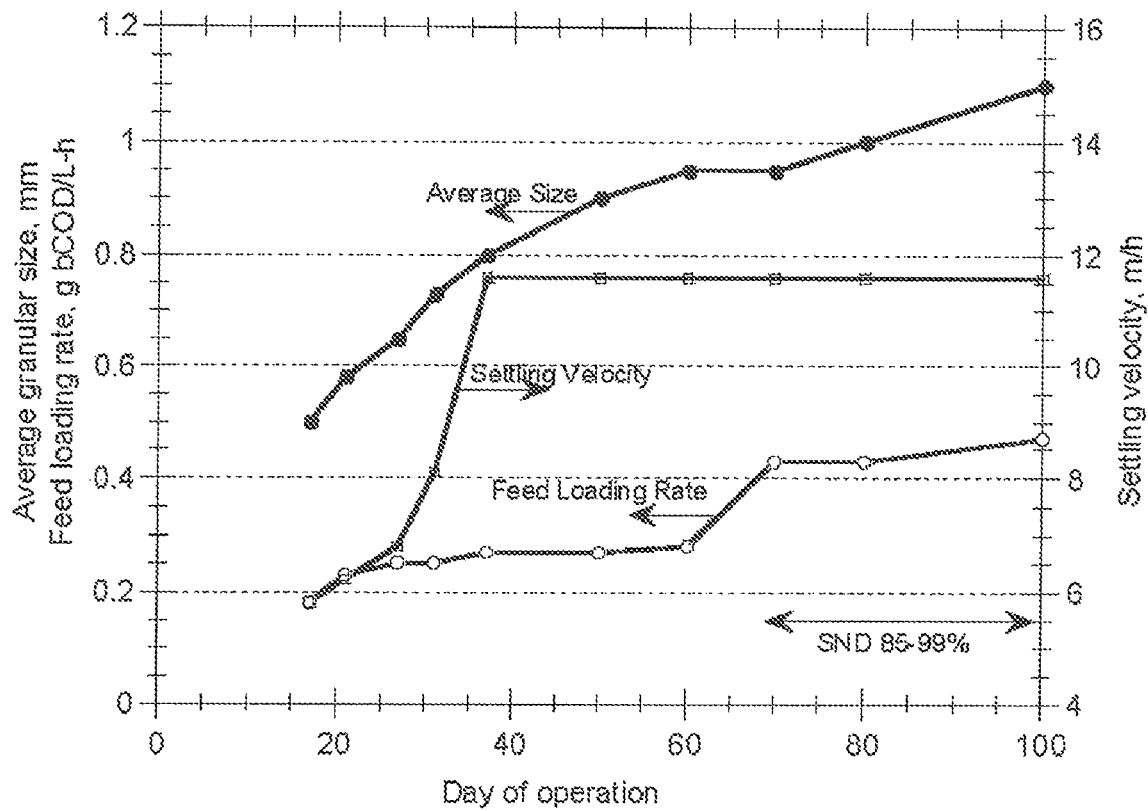
FIG. 2 is a graph showing relationship of granular size, settling velocity and bCOD loading rate.
Figure 3:
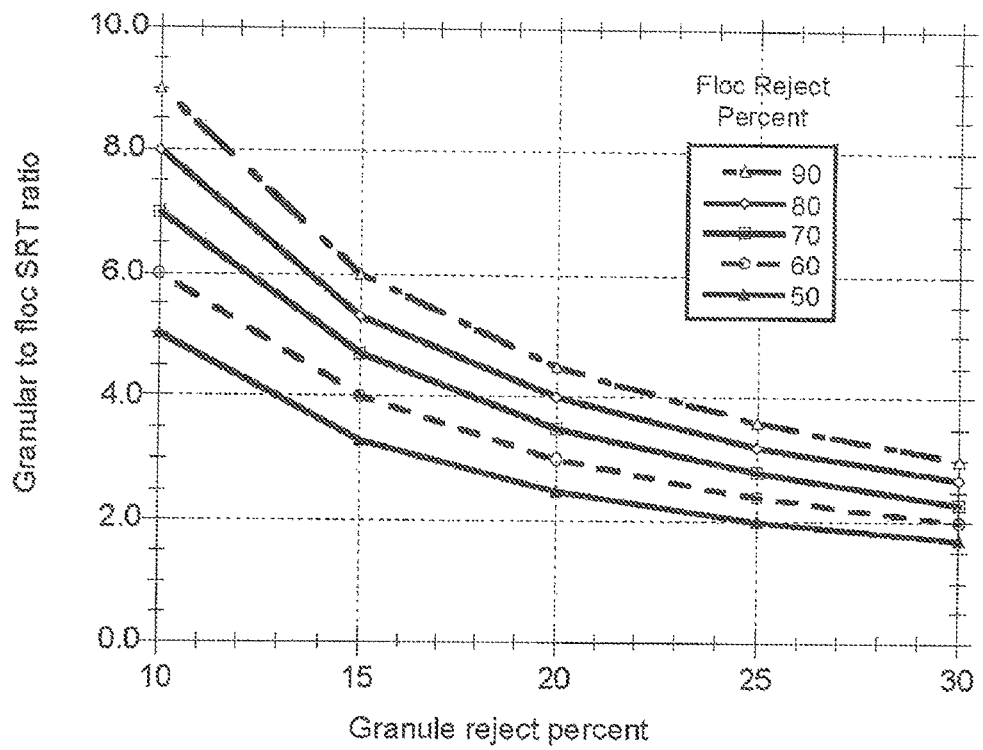
FIG. 3 is a graph showing relationship of a system granular to floc SRT ratio as function of floc and granular sludge reject efficiency from a hydraulic separator of the feed.

All of the combined granular/flocculent sludge processes shown are for continuous flow activated sludge treatment using hydraulic granular sludge classifier or separator to control granule size and to provide granule recycle to a first high loaded anaerobic or anoxic reactor. By continuous is meant essentially continuous, possibly including starts and stops but not batch process. The classifier provides a means to control the size of the granular sludge and the flocculent and granular sludge concentrations in the treatment reactor activated sludge mixed liquor. A minimum flocculent sludge concentration is needed for efficient degradation of colloidal and suspended solids in the wastewater and to provide good effluent clarity.

The flocculent sludge concentration may vary as a function of the wastewater characteristics and will be typically in the range of 500-1,500 mg/L. A preferred range of flocculent sludge for solids clarification for capture of particulates and colloidal solids is 800 mg/L-1,200 mg/L. The granular size is controlled to provide a low SVI and a high MLSS concentration and for maintaining high efficiency simultaneous nitrification-denitrification (SND) and enhanced biological phosphorus removal (EBPR). The size must be large enough to provide a sufficient anoxic volume in the granules in the aerobic reactor for SND and PAO growth, but small enough to provide efficient use of biomass growth for EBPR and have enough surface area for efficient nitrification. The granules may have a size range from 0.3 mm-3.0 mm. The preferred size may be in the range of 0.7 mm-2.0 mm. The effluent from the classifier has a much higher concentration of flocculent sludge than granular sludge and these solids are settled in the secondary clarifier. The secondary clarifier can be circular, rectangular or square. Wasting of sludge from the bottom flow from the secondary clarifier results wasting more flocculent than granular sludge from the system to thus result in a much higher granule sludge concentration in the bioprocess. Concentrations and SRTs in the reactor mixed liquor. The granular sludge concentration in the mixed liquor may be 2-8 times the flocculent sludge concentration, or in the first process zone, typically 2-3 times. Due to the high settling rates and high thickness of the granular sludge the bioprocess may have a reactor mixed liquor concentration 2-3 times that of conventional flocculent activated sludge systems and up to a typical operating range of 6,000 mg/l-12,000 mg/L to save on treatment footprint and tank volume required. The hydraulic separator provides an upflow velocity that carries out mostly flocculent solids to be removed by the final clarification step.

Granule settling velocity changes with granule size and thus the hydraulics of the classifier are controlled to select for the desirable granular size. Other types of classifiers may be used in the combined/flocculent sludge processes for granule size selection and floc separation such as screens or hydrocyclones.

Figure 4:
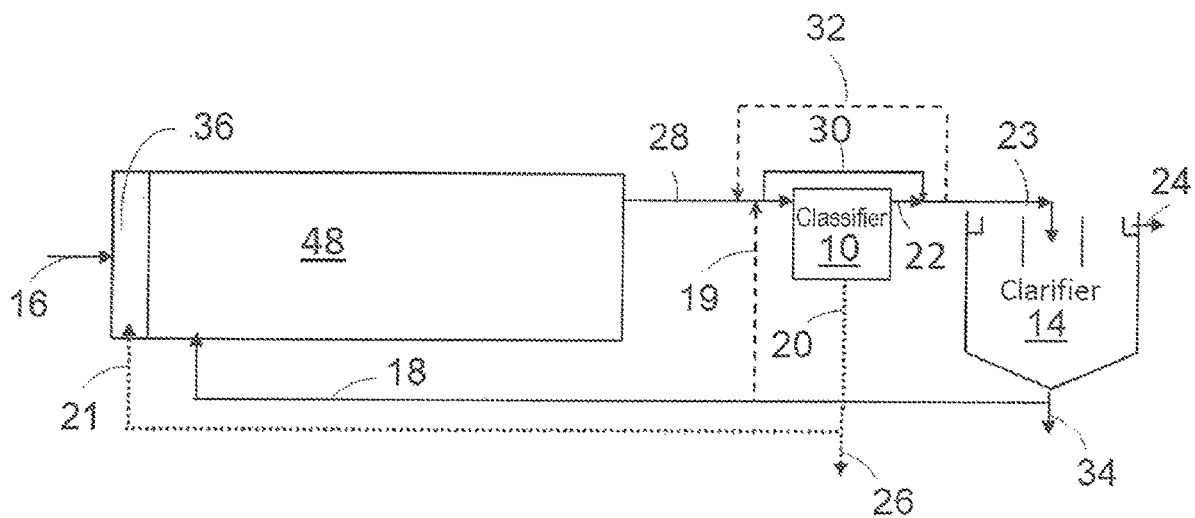
FIG. 4 shows schematic of general arrangement of continuous flow combined granular/floc sludge process.

FIG. 4 shows a general arrangement of the process for granule selection and granule size and concentration control. Granular sludge recycle flow line 21 enters an anaerobic or anoxic reactor 36 at high soluble bCOD loading where it is mixed with the influent wastewater line 16. Flow from the high loaded reactor is further processed in a downstream aerobic or anoxic reactors and in aerobic reactors consisting of one or more baffled stages. The flow from the final aerobic process line 28 enters the classifier 10 which has a separation means that produces two outflow streams. One flow contains mostly flocculent sludge line 22 which is directed to the secondary clarifier. The other flow contains mostly granules which is directed to the first reactor via line 21 with possible removal of a small portion via a line 26 for granular sludge wasting.

Flow control methods are used to maintain the hydraulic loading on the classifier with possible upflow velocities in the range of 5-20 m/h (meters per hour) to control granule size selection and maximize the flocculent sludge rejection efficiency. Rejection represents the fraction of granule or floc solids from the influent line 28 that is in the classifier effluent line 22. A high rejection percentage occurs for the smaller size flocculent sludge and a lower rejection percentage occurs for the larger size faster settling granules. A portion of the flow leaving bioprocess may be bypassed around the classifier in a bypass line 30 to divert higher flows during diurnal flow variations or due to wet weather events to control the flow rate to the classifier. When the influent wastewater flow results in lower than a desired range of flow to the classifier, recycle may be provided from the classifier effluent line 32 and/or by increasing the flow of clarifier return sludge line 18. Short cut recycle from line 18 can be used to direct recycle sludge flow to the classifier via line 19.

Sludge wasting must be done to control the activated sludge MLSS concentration at its desired levels. The primary location for wasting excess solids is line 34 from the secondary clarifier. The classifier provides a higher percentage of flocculent sludge to the clarifier due to the higher reject efficiency for the smaller solids. Thus, the secondary clarifier underflow has a higher fraction of flocculent sludge and wasting from that line results in a bioprocess with a much higher granular sludge concentration than flocculent sludge.

The sludge management approach is also to select the solids wasting rate from the secondary clarifier underflow line 34 to meet the flocculent sludge concentration needed to provide good clarification and low TSS in the effluent. If the SRT and bioprocess concentration of the granular sludge is too high than additional granular sludge can be wasted from the classifier underflow line 26.

The embodiments illustrated in FIGS. 5A, 5B, 5C, FIG. 5D, and FIG. 9 are for continuous flow combined granular/flocculent activated processes with different process features to meet the specific treatment objectives, handle different types of wastewater characteristics and select for the preferred type of granular sludge. They all incorporate a high loaded first reactor and granular sludge classifier to control the granular sludge size and relative proportions of granular and flocculent sludge in the activated sludge mixed liquor. Granule size control is important for providing an aerobic reactor with SND, which reduces energy costs for aeration and internal recycle pumping and a simpler treatment scheme than conventional nitrification and denitrification processes for nitrogen removal.

Figure 5A:
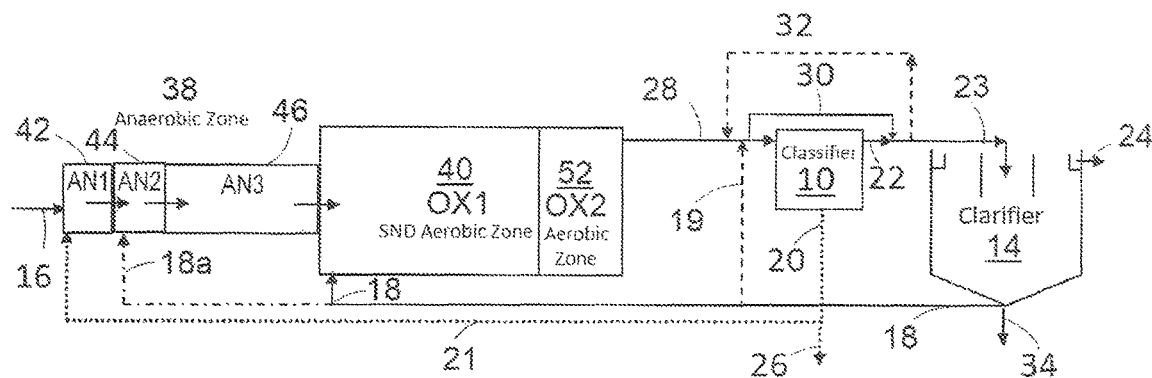
FIG. 5A shows schematic of a variation of the process for a phosphorus and nitrogen removal including simultaneous nitrification-denitrification.

The first embodiment shown in FIG. 5A is a continuous flow combined granule/flocculent sludge process to grow granules with PAOs and to allow SND to achieve for both biological nitrogen and phosphorus removal. The process has an anaerobic zone 38, an aerobic zone with SND 40, a final aerobic zone at higher DO 52, granular sludge classifier 10, and a secondary clarifier 14.

Granular sludge is recycled from the classifier line 21 to an anaerobic reactor 42 with a volume that result in a high soluble bCOD loading from the influent flow line 16. The anaerobic zone may have at least 3 stages (3 mixed reactors in series) with the first reactor at a high soluble bCOD loading of greater than 4.8 g soluble bCOD/L-day and less than 30 g soluble bCOD/L-day. The $2^{nd}$ stage volume 44 is at least as large as the $1^{st}$ stage and preferably no more than double. The $3^{rd}$ stage 46 is much larger and can exist as a single tank or be divided into multiple stages. The high soluble bCOD loading assures a higher bulk liquid soluble bCOD concentration and creates a long enough diffusion gradient to drive substrate deeper into the granules for subsequent oxidation by $NO_3/NO_2$ for SND in the aerobic zone to enable larger size granules.

Mixed liquor from the anaerobic zone enters 38 enters an aerobic reactor 40 that has DO control to allow SND. If DO concentration is too high then oxygen penetrates too deep into the granule to limit use of $NO_3/NO_2$ by the PAOs. If too low the nitrification rate on the outer layer of the granules is too low to result in a low nitrification efficiency. A lower nitrification efficiency can lead to less nitrogen removal.

The aeration tank 40 can be a single aerated mixed tank or divided into a number of tanks in series. Aeration DO control maintains the DO concentration at set points in the range of 0.5 mg/L-2.5 mg/L depending on the MLSS and granular size so that SND occurs for nitrogen removal. Nitrifying bacteria growth is primarily on the outer layers of the granule, where the DO concentration is higher, and PAOs are generally in the inner core of the granule, which can use $NO_3/NO_2$ produced by nitrifying bacteria in the outer granule.

The classifier (separator) and secondary clarifier process and operation is the same as that described for FIG. 4 above. One exception is that the increased return activated sludge recycle flow to control the classifier velocity may also be provided in a separate flow line 19 from the return flocculent sludge recycle instead of only increasing the flow in line 18.

The sludge wasting to control the bioprocess granular and flocculent sludge concentrations is the same as described for the general configuration in FIG. 4 above.

Anaerobic zone stages after the first stage 42 may be operated with on/off mixing to allowed solids settling and fermentation of solids to produce more localized soluble bCOD for uptake by granules with PAOs. Some return activated sludge flow line 18a may be added to the anaerobic stage with on-off mixing to provide other solids that can be fermented to produce soluble bCOD.

Figure 5B:
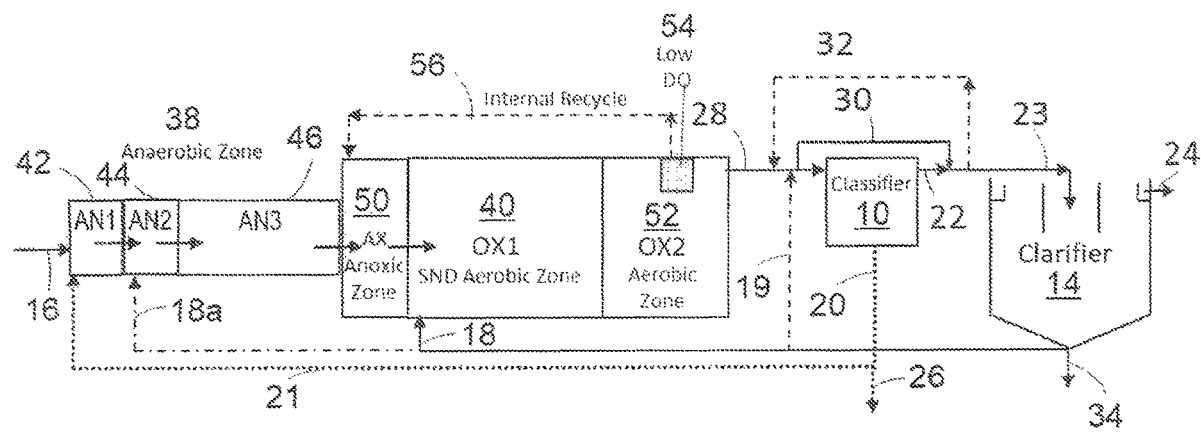
FIG. 5B shows schematic of a variation of the process for a phosphorus and nitrogen removal including simultaneous nitrification-denitrification for treating wastewater with a lower soluble bCOD fraction.

A modification to Embodiment 1 for wastewater with a low influent soluble bCOD relative to the influent total organic and ammonia nitrogen is shown in FIG. 5B. The modification relies on the degradation of particulate and colloidal solids to provide degradable COD for denitrification. This process contains an anaerobic zone 38 anoxic zone 50, a SND aerobic zone 40, a second aerobic zone 52, a low DO zone 54, a granular sludge classifier 10, and a secondary clarifier 14.

This process is necessary for applications lacking enough soluble bCOD to enable high removal of nitrogen by SND with PAO granular sludge. Due to the low soluble bCOD:N ratio the amount of stored carbon by PAOs in the anaerobic zone cannot provide enough electron donor to consume a high percentage of the amount of $NO_3/NO_2$ produced in the aerobic zone. An internal recycle flow, line 56, from the low DO zone 54 within the second aerobic zone 52 provides $NO_3/NO_2$ to the unaerated mixed anoxic zone 50 for consumption of $NO_3/NO_2$ with oxidation of particulate and colloidal solids. The internal recycle flowrate may range from 50 to 500% of the wastewater influent flowrate. The anoxic and aeration zones may consist of a single reactor or a number of reactors operated in series.

Additional carbon is provided by biodegradable colloidal and suspended solids in the preanoxic zone 50 before the aerobic SND zone 40. The additional aerobic zone 52 operated at a higher DO concentration is provided after the SND aerobic zone for further $NH_3$ oxidation and enhance further P uptake.

For this process all the features and operational conditions of the anaerobic zone 38, SND aerobic zone 40, final aerobic zone 52 described for FIG. 5A are applicable. Also, all the features and operational conditions described for the classifier and clarifier and sludge management are applicable and clarifier operation described in Embodiment 1 above with FIG. 5A are included.

Figure 5C:
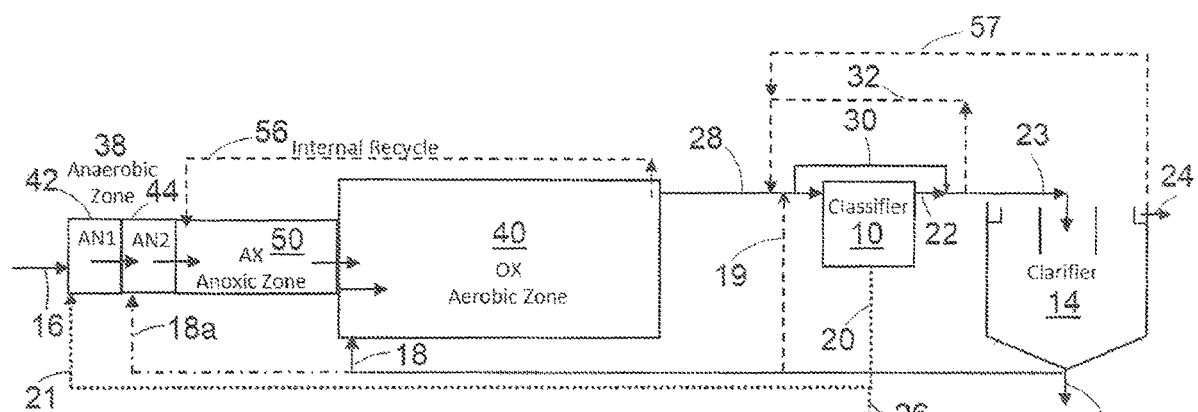
FIG. 5C shows schematic of a variation of the process for nitrogen removal with anaerobic granule selector zone.

A modification to Embodiment 1 for applications for which nitrogen removal and not phosphorus is required is shown in FIG. 5C. An anaerobic high loaded first reactor is used to select for PAO granules. Mixed liquor flows from anaerobic reactor 44 to an anoxic zone 50 that may be single or multiple stages. The PAO granules from reactor 44 use stored carbon obtain in reactors 42 and 44 for denitrification in zone 50. FIG. 5C also shows a clarified effluent recycle line 57 for dilution of the influent to the classifier/separator 10, to achieve optimum dilution for separation of granules, as needed. This is an option for all of FIGS. 4 to 5C, and even for FIG. 5D, discussed below, in which clarified effluent from the main process can be cycled to the separator for dilution. Other sources of clarified liquid or water could also be used for this purpose. See dilution line 57 in FIG. 5D.

Figure 5D:
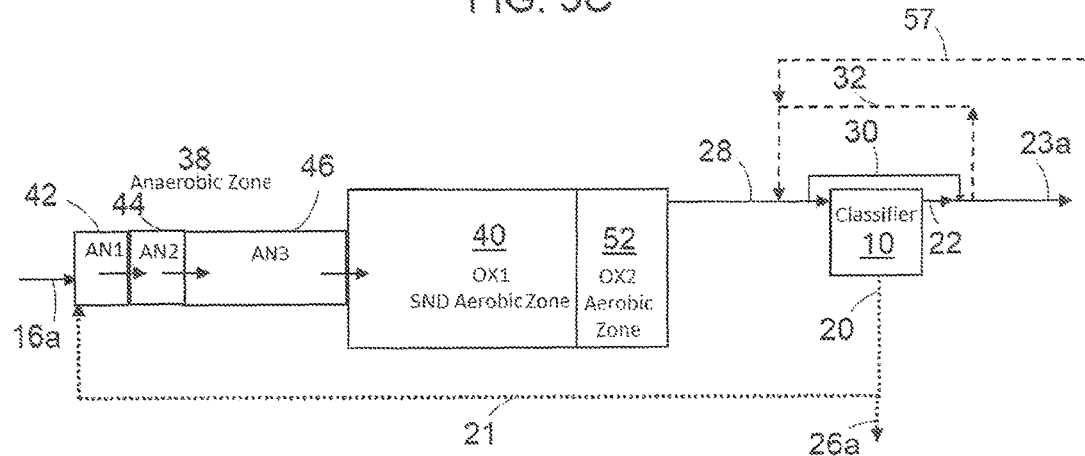
FIG. 5D shows schematic of a process for production of granular sludge in sidestream treatment for feeding granules to the main wastewater treatment process.

Embodiment 2 shown in FIG. 5D is used for growth of granules to add to the main treatment system and does not itself have a final secondary clarifier as in Embodiment 1. The system is a sidestream incubator for granular sludge. The first high loaded anaerobic reactor 42 is fed line 16a which may be, for example, a reject liquid from digestion dewatering or a small portion of the influent wastewater flow, or another wastewater stream, MLSS from one of the main process zones, or even industrial wastewater, with addition of other organics if necessary. The process selects for PAO granules that are fed via line 26a to a liquid treatment system producing the treated effluent for the wastewater treatment plant, e.g. to the main process systems of FIGS. 4 and 5A to 5C, preferably to an anaerobic zone as at the line 21 in FIGS. 4 to 5C. Effluent from the anaerobic zone is preferably fed to a short-SRT aerobic zone 52 but could also be fed first to an SND aerobic zone 40 followed by a longer-SRT aerobic zone 52. The classifier overflow final effluent line 23a is also fed to the main liquid treatment system, preferably to an aerobic or anoxic zone. Treatment of influent flow 16a follows the same course as for the system in FIG. 5A to produce PAO granules. Recycle of underflow from the classifier or separator 10 in FIG. 5D is directed to reactor 42 operated at a high soluble bCOD load.

The sludge classifier (separator) is the key component for the control and optimization of granular/flocculent activated sludge processes.

Figure 7:
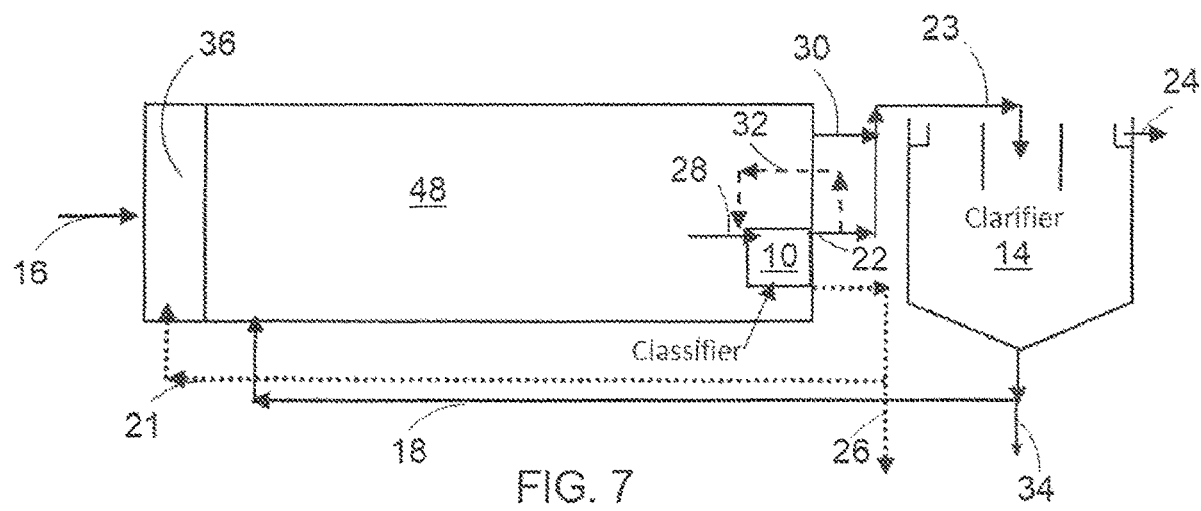
FIG. 7 shows schematic for locating the granular sludge classifier in the bioprocess.
Figure 8A:
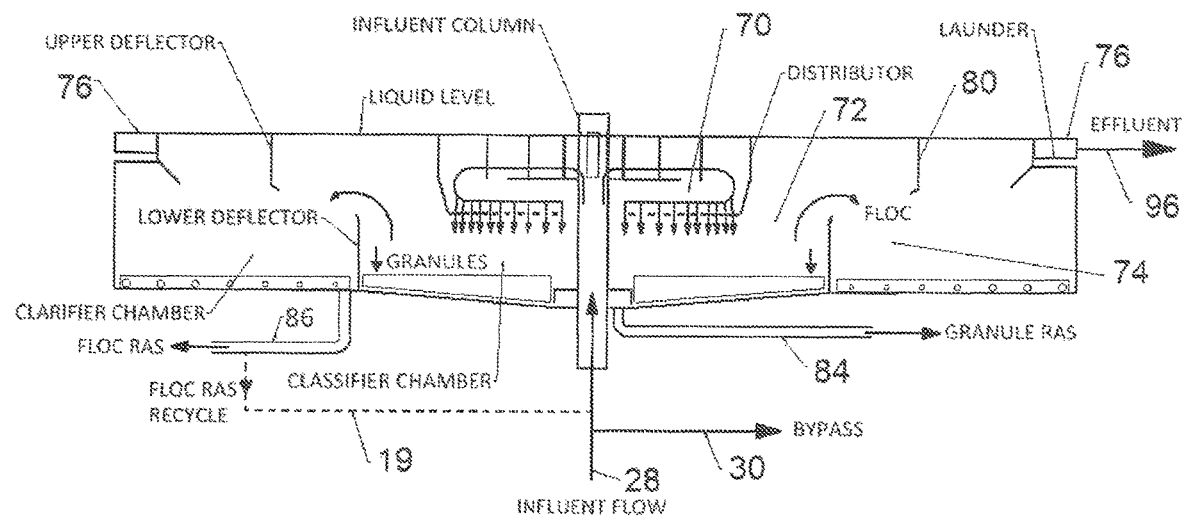
FIG. 8A shows schematic of a downflow granular sludge classifier located in the secondary clarifier.
Figure 8B:
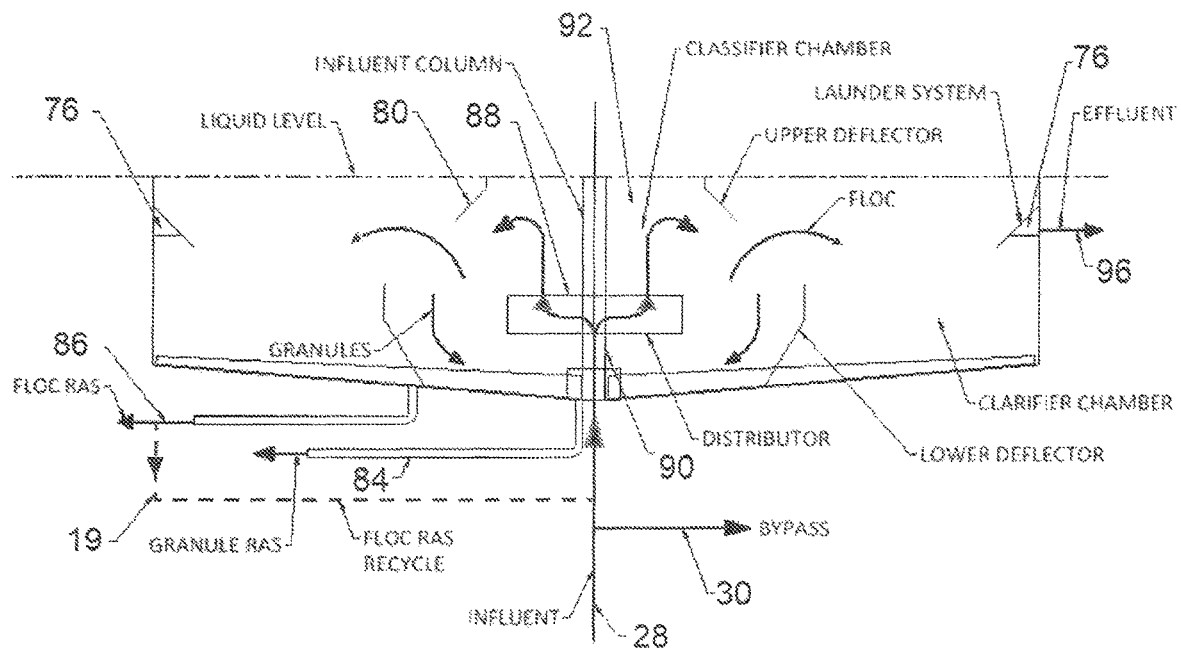
FIG. 8B shows schematic of a submerged upflow granular sludge classifier located in the secondary clarifier.

The sludge classifier or separator uses a hydraulic design to control the relative capture efficiency of granules and floc and to also control the size of the granular sludge. The classifier is a downflow or upward feed and upflow effluent design that separates the appropriate solids size as a function of the apparatus upflow velocity. The upflow velocity is greater than 1.0 m/hr to minimize floc settling in the lower chamber. The classifier/separator may be contained in the bioreactor tankage as shown in FIG. 7, located between the bioreactor and liquid/solids separation clarifier as shown in FIGS. 6A and 6B, or located within a conventional secondary clarifier as shown in FIGS. 8A and 8B.

Figure 6A:
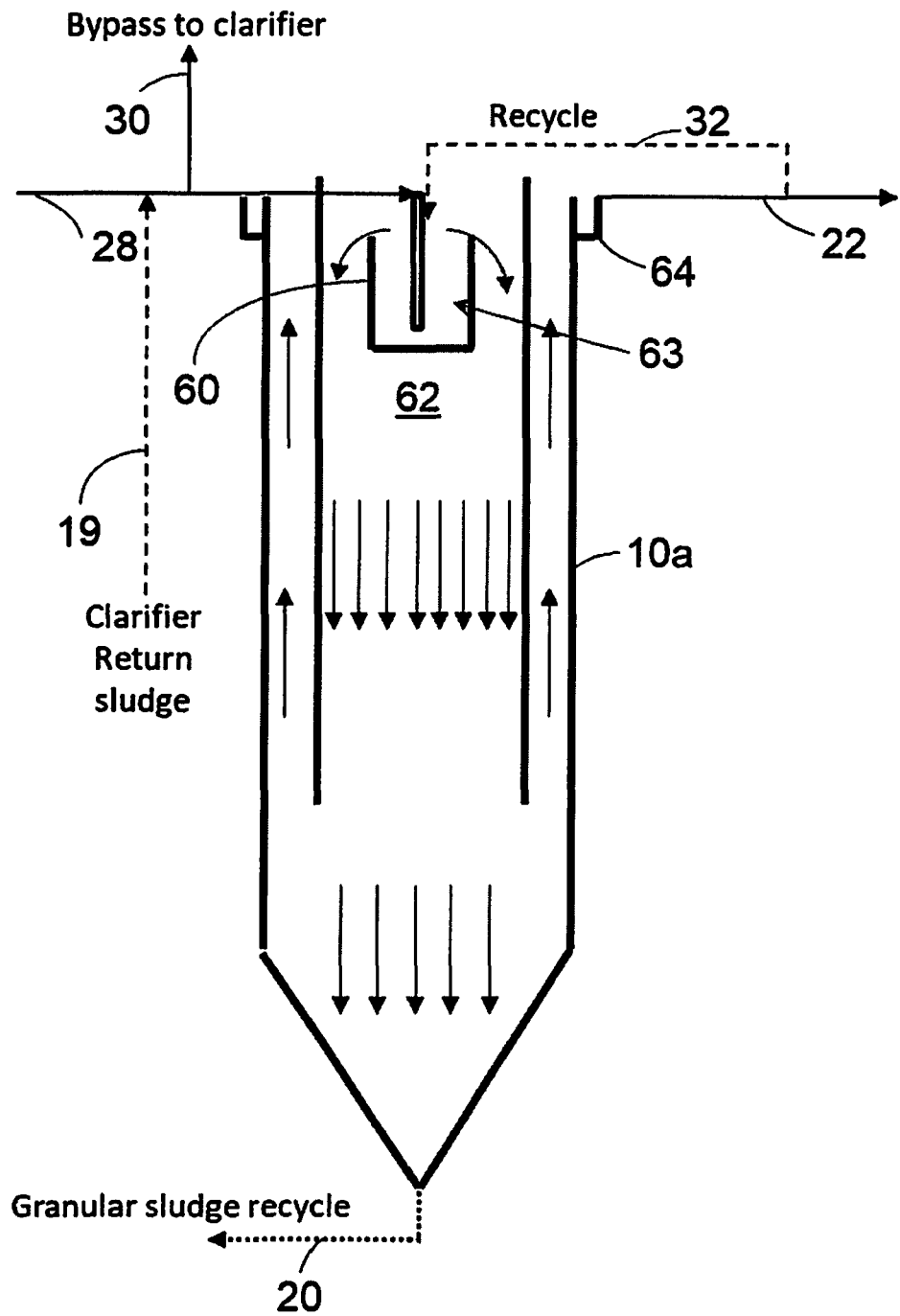
FIG. 6A shows schematic of a downflow granular sludge classifier.

A schematic of the granular/flocculent downflow classifier 10a located between the bioreactor and liquid/solids separation clarifier is shown in FIG. 6A. The effluent flow line 28, from the aerobic process zone plus classifier effluent recycle flow line 32, enters an energy dissipater 60, preferably but not necessarily submerged, that distributes a uniform down flow of the mixed liquor and promotes separation of granule and floc. The flow travels downward in the inner chamber 62 and the fast settling granules continue to settle to the bottom of the classifier. A majority of the flow from the inner chamber flows to the outer chamber 63 and the resulting liquid rise velocity in the outer chamber is greater than the floc settling velocity of floc, which causes floc to be carried upward and out with the flow over the effluent launder 64 to the secondary clarifier through the classifier effluent line 22. Due to the fact, granular sludge has a much higher settling velocity than flocculent sludge, the solids rising in the outer chamber will consist mainly of flocculent sludge. The rise rate can also be controlled to select for granular size by varying the recycle flow rate line 32. At very high flow rates, due to peak diurnal flow or wet weather flow, a portion of the influent flow to the classifier can be bypassed using the high flow bypass line 30 to the secondary clarifier so that the classifier's preferred rise rate is maintained. The granules are collected and thickened at the bottom of the classifier 10a and exits via line 20 to continuous flow recycle line to the high load granular biomass selector tank at the beginning of the upstream activated sludge process and also split to a waste line to be used as needed.

Figure 6B:
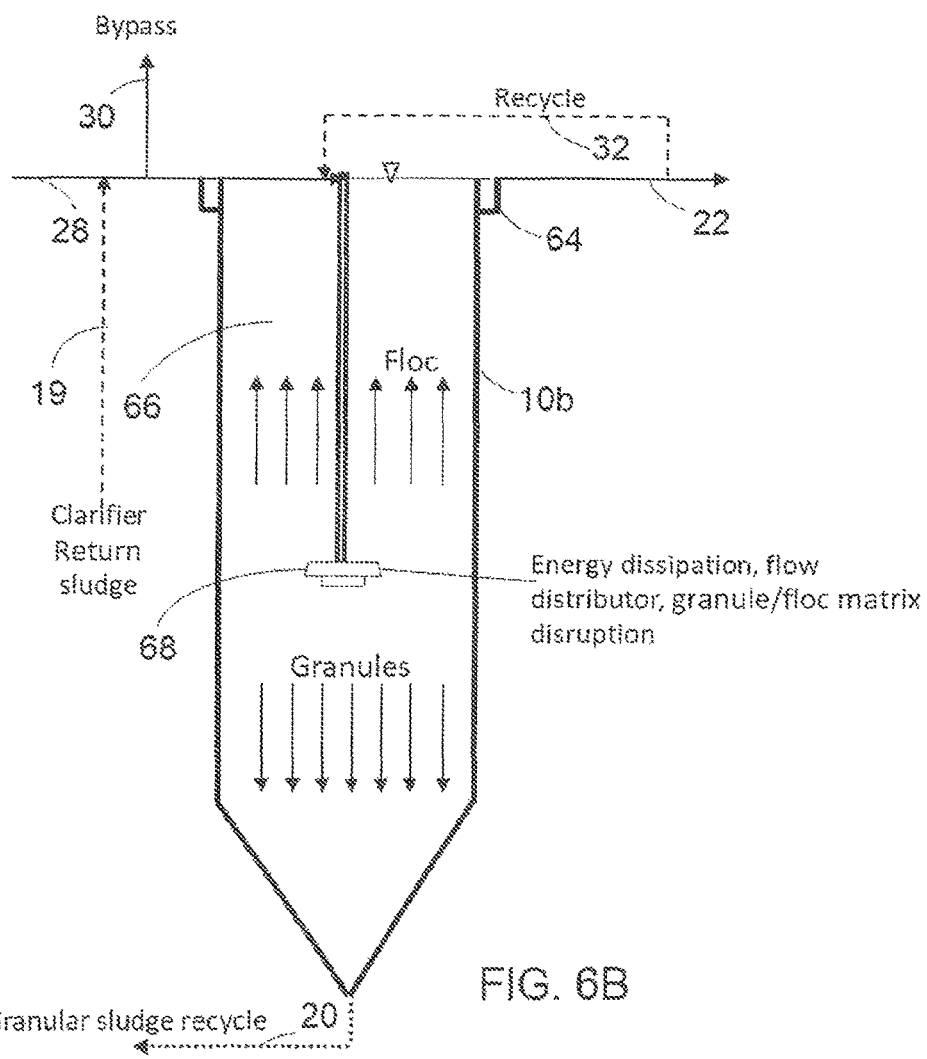
FIG. 6B shows schematic of a upflow granular sludge classifier.

A schematic of the granular/flocculent sludge upflow classifier 10b located between the bioreactor and liquid/solids separation clarifier is shown in FIG. 6B. The influent feed from the activated sludge bioreactor line 28 plus the effluent recycle flow line 32 is introduced into the energy dissipater 68 preferably submerged and located at an appropriate depth within the classifier that distributes a uniform radial flow and promotes separation of granules and floc. Preferably the dissipater is between one-third and two thirds of the classifier tank liquid depth, or within 30% of center of the tank's depth. The classifier's dimension and total feed flow rate determine the upflow velocity in the upper region of the chamber 66 to separate granules and floc and determine the granule size. The granules with settling velocity greater than the upflow velocity are captured and thickened at the bottom of the classifier 10b and exits via line 20 to a continuous flow recycle line to the high load granular biomass selector tank at the beginning of the upstream activated sludge process and also split to a waste line to be used as needed. The rise rate can also be controlled to select for granular size by varying the recycle flow rate, line 32. At very high flow rates due to peak diurnal flow or wet weather flow a portion of the influent flow to the classifier can be bypassed using the peak flow bypass line 30 to the secondary clarifier so that the classifier desired rise rate is maintained.

In a preferred embodiment of the system of the invention the classifier processes at least two times daily system influent volume per day.

The general schematic in FIG. 7 illustrates that the classifier can be located in the bioprocess, typically after the last aeration reactor. Granular sludge recycle flow from the classifier line 21 enters a granular feed reactor 36 at a high soluble bCOD loading where it is mixed with the influent wastewater line 16. The granular feed reactor 36 may be anaerobic (as in FIGS. 5A, 5B, and 5C) or anoxic (as in FIG. 9). The bioprocess zone 48 after the granular feed reactor may contain a series of anaerobic, anoxic and aerobic reactors in some configuration. Mixed liquor flow from a final bioprocess reactor enters the classifier 10 and most or all of the flow in the classifier underflow line is in the granular sludge recycle line 21 or a lesser amount for granular sludge wasting line 26. Flow control to the classifier at low influent flow conditions may be provided by recycle of flow from the classifier effluent line 22 back to the classifier inflow via line 32 and/or by increasing the flocculent sludge recycle flow rate from the secondary clarifier 14 via line 18. At excessive high flow conditions bioprocess effluent flow beyond that desired for the classifier may be directed from the final bioprocess reactor to the clarifier 14 via line 30. The total influent flow line 23 to the clarifier 14 equals the clarifier effluent flow following solids settling line 24 plus clarifier underflow with a thicker flocculent sludge concentration in a recycle flow to the bioprocess 48 and a small amount of flow for mainly flocculent sludge wasting line 34.

A schematic of the granular/flocculent downflow classifier located within a conventional secondary clarifier is shown in FIG. 8A. The effluent flow line 28 from the activated sludge bioreactor plus clarifier floc recycle flow line 19 enters an energy dissipater 70 that distributes a uniform down flow of the mixed liquor and promotes separation of granules and floc. Alternatively, the recycle flow rate to the bioprocess in line 18 could be increased. The flow travels downward in the inner, classifier chamber 72, the granules are settling faster than the floc. Floc from the classifier chamber 72 flows into the outer, secondary clarifier chamber 74 with an upflow velocity that lifts particles with settling velocity less than the rise velocity. Flow is toward the effluent launder 76. Floc then is allowed to settle to the bottom of the secondary clarifier chamber 74 and the clarifier liquid is carried into the effluent launder and out through the clarified effluent line 96. Due to the fact that granular sludge has a much higher settling velocity than flocculent sludge, the solids leaving the classifier chamber 72, i.e. flowing outwardly between an upper annular deflector 80 and a lower annular sludge dividing deflector 82 will consist mainly of flocculent sludge. The rise rate in the classifier chamber 72 can also be controlled to select for granular size by varying the clarifier floc recycle flowrate line 32. At very high flow rates due to peak diurnal flow or wet weather flow a portion of the influent flow to the classifier can be bypassed using the high flow bypass line 30 to a separate secondary clarifier so that the classifier preferred rise rate is maintained. The granules are collected and thickened at the bottom 78 of the classifier chamber 72 and recycled, via line 84, to the high loaded first reactor of the upstream activated sludge process. The floc are also collected and thickened at the bottom of the secondary clarifier chamber 74 and recycled, via line 86, to the appropriate location in the upstream activated sludge process.

A schematic of a more preferred embodiment of a granular/flocculent upflow classifier located within a conventional secondary clarifier is shown in FIG. 8B. The effluent flow from the activated sludge bioreactor, line 28, plus clarifier floc recycle flow line 19 enters an energy dissipater, flow distribution, and granule/floc separation device 88 located at an appropriate depth within the inner, classifier chamber 92, preferably below center as shown. This combined influent flow enters the separation device 88 via ports (not shown) in the center influent 90 of the clarifier. The flow travels upward and outward, the granules are settling faster than the floc and tend to settle in the classifier chamber 92 of the clarifier. Floc from the classifier chamber 92 flows into the outer, secondary clarifier chamber 94 with an outward and upward flow velocity that lifts particles with settling velocity less than the rise velocity. Again, upper and lower annular deflector plates 80 and 82, respectively, help direct flow in and out of the classifier chamber 92. Floc flows out of the classifier chamber to the secondary clarifier chamber 94. Floc is allowed to settle to the secondary clarifier floor in the secondary clarifier chamber and the clarified liquid is carried into the effluent launder 76 and out through the clarified effluent line 96. Due to the fact that granular sludge has a much higher settling velocity than flocculent sludge, the solids leaving classifier chamber 92 will consist mainly of flocculent sludge. The rise rate in the classifier chamber 92 can also be controlled to select for granular size by varying the clarifier floc recycle flowrate line 19. At very high flow rates, due to peak diurnal flow or wet weather flow, a portion of the influent flow 28 to the classifier can be bypassed using a high flow bypass line 30 to a separate secondary clarifier so that the classifier preferred rise rate is maintained. The granules are collected and thickened at the bottom of the classifier chamber 92 and recycled line 84 to high loaded first reactor of the upstream activated sludge process. The floc are also collected and thickened at the bottom of the secondary clarifier chamber 94 and recycled, via line 86, to the appropriate location in the upstream activated sludge process.

Figure 9:
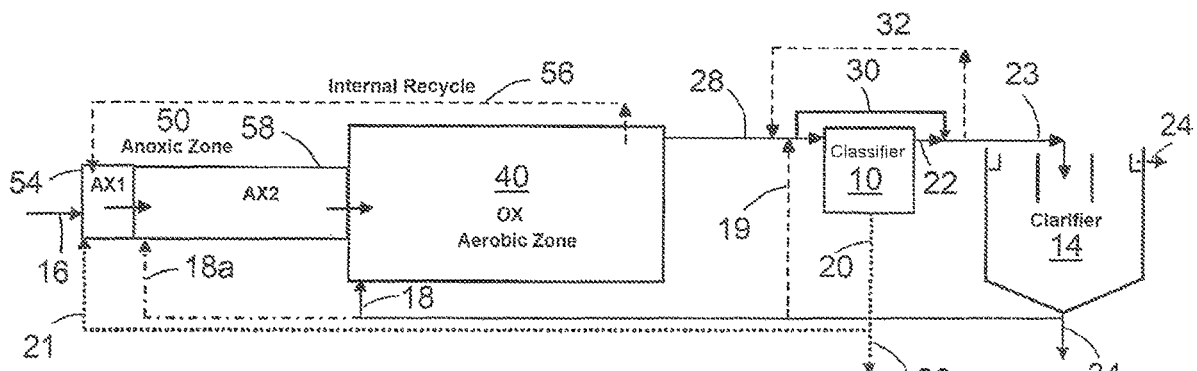
FIG. 9 shows schematic of a variation of the process for nitrogen removal with anoxic granule selector zone.

Embodiment 3 shown in FIG. 9 is for a continuous flow combined granular/flocculent sludge process for nitrogen removal where phosphorus removal is not needed. No anaerobic zone is used in this case and the granules grown are based on the classifier operation and the soluble bCOD loading to the first stage reactor 54 of the anoxic zone 50. The process contains an anoxic zone 50, an aerobic zone 40, a granular sludge classifier 10 and secondary clarifier 14. The second anoxic reactor 58 may be single stage or divided into two or more stages. The aerobic zone 40 may also be single stage or divided into two or more stages.

All the features and operational conditions described for the classifier and clarifier and sludge management are applicable and clarifier operation described in Embodiment 1 above with FIG. 5A are included.

Figure 10A:
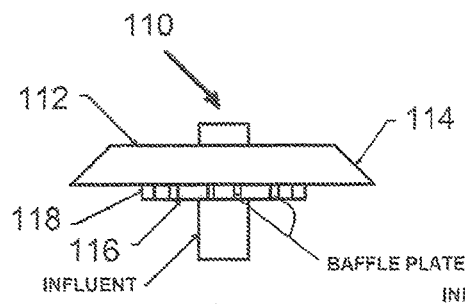
FIGS. 10A-10D show schematics of a radial flow energy dissipating inlet with radial flow for use in a granular sludge classifier or separator.
Figure 10B:
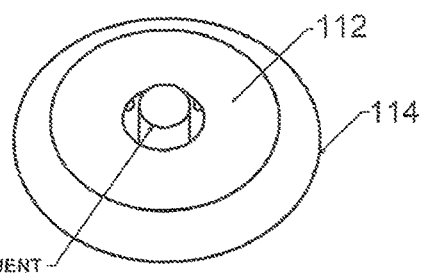
Figure 10C:
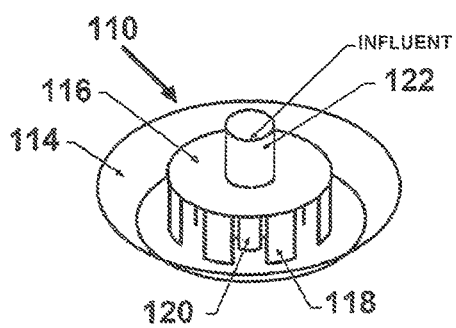
Figure 10D:
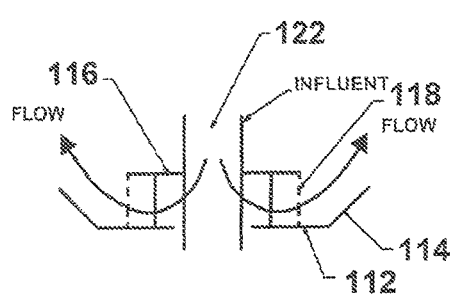

FIGS. 10A through 10D show an energy dissipating inlet (EDI) 110 that can be used in the preferred classifier shown in FIG. 6B. This is sometimes called a reverse energy dissipating inlet or reverse EDI, and can be used upright as in FIGS. 10A and 10B, or inverted as in FIGS. 10C and 10D. The EDI has a top plate 112, a top deflector plate 114 at the periphery of the top plate, a bottom plate 116 and a series of outer and inner baffle plates 118 and 120, offset in position as shown in FIG. 10D, which shows a preferred inverted condition of the EDI 110. The sectional view of FIG. 10D is also inverted, showing inner baffles at 120 and the outer baffles 118 in dashed lines, since they are in staggered positions with the inner baffles at baffle. In this position the top plate 112 is actually at the bottom. As can be seen from FIGS. 10C and 10D, flow is down through the influent pipe 122 to the interior of the EDI, where the baffles dissipate energy, slow and distribute the flow generally evenly into the volume of liquid, tending to separate the floc and granular sludge, with an upward and outward flow pattern.

Figure 11A:
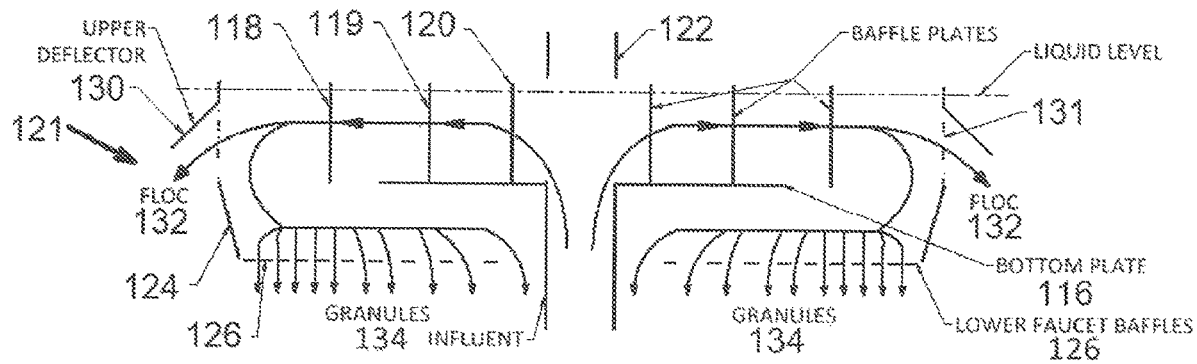
FIGS. 11A-11B show schematics of an energy dissipating inlet for a granular sludge classifier or separator utilizing a downflow separation design.
Figure 11B:
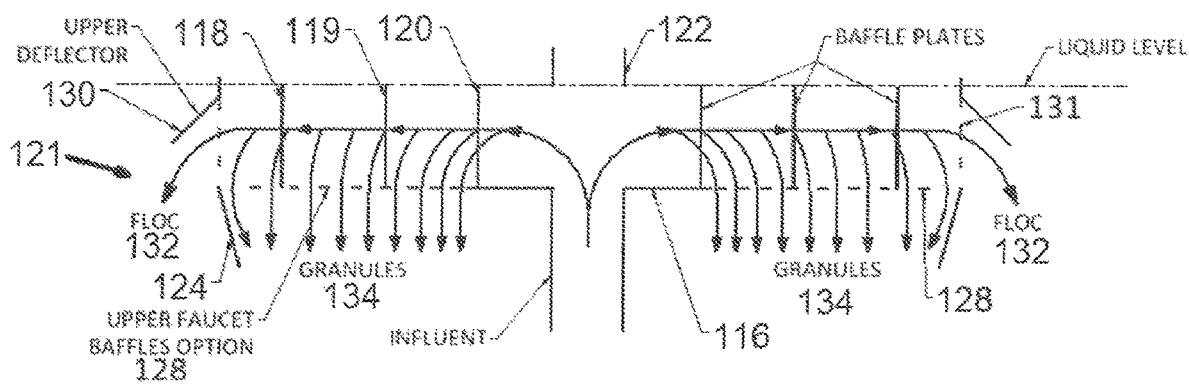

FIGS. 11A and 11B show an energy dissipating inlet (EDI) 121 that can be used in the classifier shown in FIG. 6A and in the classifier area of the clarifier in FIG. 8A utilizing the downflow separation design. This is sometimes called a faucet energy dissipating inlet, and can be used with faucet baffles at bottom of the lower deflector 124 as in FIG. 11A, or at the bottom plate 116 as in FIG. 11B. The EDI 121 has a bottom plate and a series of outer and inner baffles (118 and 120) similar to the reverse EDI 110 shown in FIGS. 10A through 10D. EDI 121 also has more baffled layers 119 than EDI 110 with each baffled layer, from the most inner to the most outer, offset from each other to provide increased energy dissipation and optimum flow patterns to disrupt the granule/floc matrix for optimum separation of granules from the floc structure. In addition, upper faucet baffling system in FIG. 11A or a lower faucet baffling system in FIG. 11B is added to equalize flow distribution of the granules which have separated from the floc structure such that the granules settle over the entire classifier floor area. The faucet baffle system has openings which vary in size so that the beginning flow is restricted from exiting the closest opening and requires the flow to continue flowing to the next opening until the flow is equalized. The faucet layer can be placed at the lower exit of the EDI 121 which is referred to the lower faucet baffles 126 as shown in FIG. 11A, or this faucet baffle system can replace a portion of the bottom plate 116 at the upper exit which is referred to the upper faucet baffles 128 shown in FIG. 11B. The lower faucet baffles 126 in FIG. 11A receive the settled granules from the upper layer of radial baffles at the outer edge of the bottom plate 116. The lower faucet baffles 126, in this configuration, restrict all the granules from exiting at the outer edge of the lower deflector 124 requiring the flow to continue flowing to the next opening until the flow is equalized and the granules settle evenly over the entire classifier floor area. In contrast, the upper faucet baffles 128 in FIG. 11B allow the granules that have settled at each radial baffle layer to pass through the faucet opening while the floc is kept suspended, enters an outer annular part, still high up in the EDI as shown, and finally exits through an annular array of floc discharge outlets 131 along an upper deflector 130 which directs the floc 132 outwardly and downwardly into the clarifier area. After passing through the upper faucet baffles 128, the granules 134 then settle evenly over the entire classifier floor area of the tank with the lower deflector 124 preventing short circuiting into the clarifier area of the tank.

Figure 12:
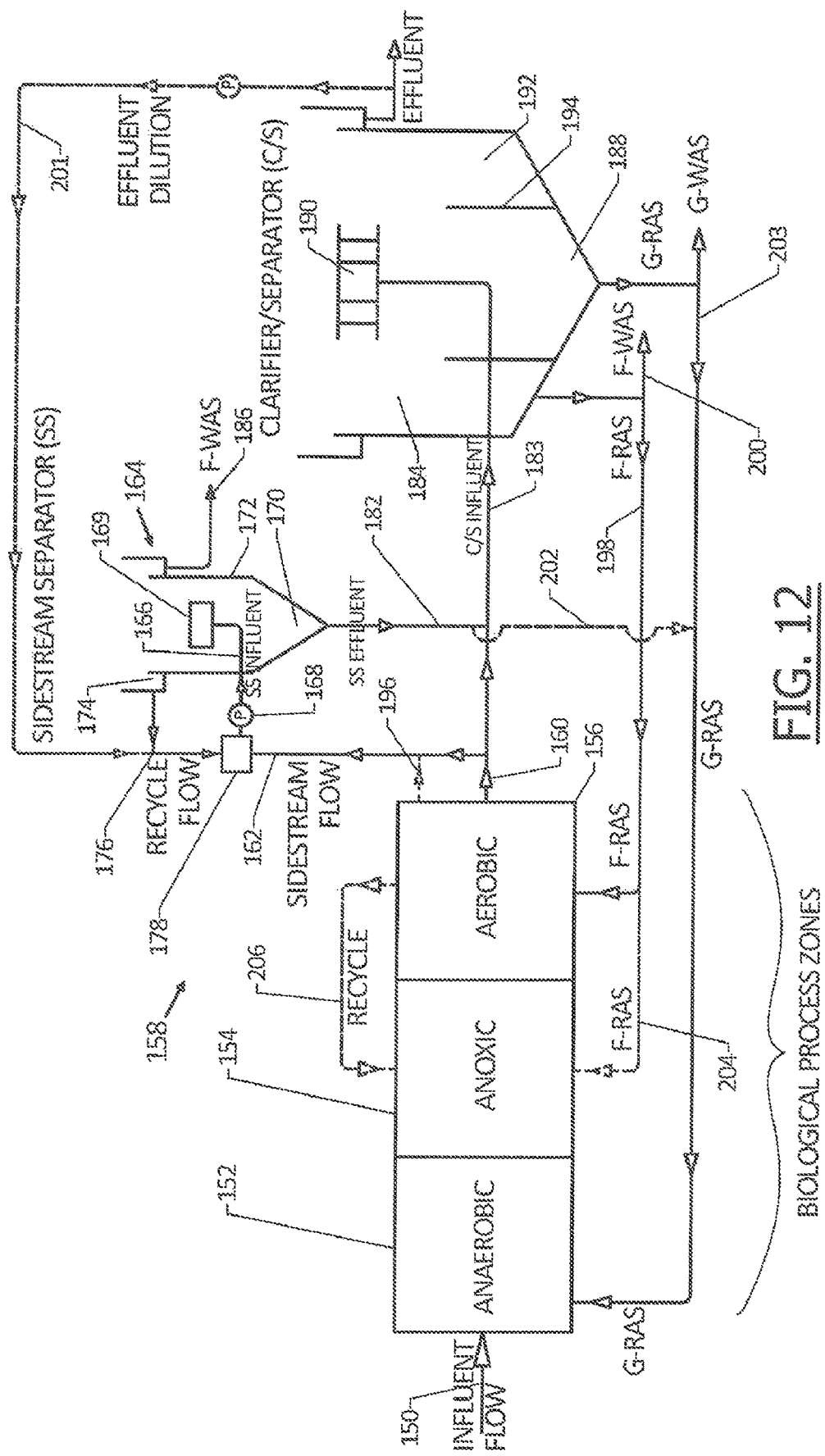
FIG. 12 is a schematic diagram showing a particular embodiment with a sidestream separator, which may be in addition to a separator in the clarifier.

FIG. 12 is a schematic diagram showing another wastewater treatment system of the invention including a classifier or separator for enhancing granular sludge content. In this case the system, the liquid side of a treatment system as shown, includes an influent flow 150 into a series of biological treatment zones, in this case shown as an anaerobic zone 152, an anoxic zone 154 and an aerobic treatment zone 156. The anoxic zone 154 could be a "swing" zone by having aeration at a controlled rate to have simultaneous nitrification/denitrification, and the two zones 154 and 156 could be a single anoxic/oxic "swing" zone. Note that each of the process zones may contain one or more tanks in series.

The system shown in FIG. 12 includes a sidestream generally identified as 158, receiving a flow from the zone 156, i.e. from the aerobic or anoxic/oxic zone. Effluent from the zone 156, indicated at 160, is divided such that a selected portion of this flow goes into the sidestream, at 162. A sidestream separator or classifier, for granule/floc separation, is indicated at 164, and the sidestream flow is directed into the separator via a flow line 166. A pump 168 may be provided for this purpose, although in some cases the flow to the separator 164 could be by gravity. The influent to the separator 164 is via an EDI 169, which can be configured as in some of the previously described embodiments, such that granular sludge is encouraged into a bottom region 170 of the separator vessel 172, while primarily floc sludge is collected at an upper end, indicated as overflowing into a floc collection launder at 174.

The drawing also shows an internal recycle flow at 176, from the primarily floc collection launder 174, dropping by gravity. This recycle flow 176 joins with the incoming sidestream feed flow 162 at a collection box 178. The pump 168 preferably is adjustable, and is set to maintain a prescribed flow rate, with recycle 176 and incoming feed flow 162, through the separator 164 for desired flow velocities in the separator to encourage separation of granular sludge from floc sludge. In conditions where sidestream flow 162 is minimal, volumetric flow into the separator should be kept substantially constant, thus the internal recycle flow loop 176. If conditions are such that the liquid level in the collection box 178 becomes too low as determined by a sensor, the pump can be automatically shut off.

As indicated in the drawing, a first effluent of the sidestream separator, indicated as "SS effluent" in the drawing, at 182, is enhanced in granular concentration and preferably is rejoined with the main flow 160, to be introduced as a combined flow 183 into a clarifier 184. A second effluent of the separator 164 preferably comes from the upper end of the separator, in the same manner as the recycle flow 176, and comprises primarily floc sludge. This is indicated as a wasted stream 186 in the drawing, "F-WAS".

In one implementation of the invention, the combined flow 183 of granular-rich sludge and effluent sludge from the process zone 156 can be delivered into the illustrated clarifier 184 in a conventional manner, typically through an energy dissipating inlet (EDI). The sludge to be settled in the clarifier will be enhanced in granular content, and since granular sludge settles at a faster rate than floc, the central bottom 188 of the clarifier will tend to concentrate the granular sludge. However, in the illustrated embodiment the clarifier's EDI 190 is a special separator EDI, i.e. a further separator that works in conjunction with the geometry of the clarifier to concentrate granular sludge even further. For example, the EDI can be similar to the separators shown in FIGS. 11A and 11B, or the clarifier/separator combination can be essentially as shown in FIGS. 8A and 8B. In any event, the EDI/separator 190 tends to separate granular from floc sludge, depositing granular sludge downward essentially centrally in the clarifier, while floc sludge tends to drift outwardly and to be collected as primarily granular sludge in an outer annular region 192 of the clarifier. The clarifier can include a dividing ring 194 to mostly separate primarily floc sludge into the outer region 192, while primarily granular sludge drops to central bottom region 188.

In FIG. 12 a dashed line 196 is shown for withdrawal of MLSS from a desired level directly from the aerobic process zone 156.

FIG. 12 shows a recycle line 198 (F-RAS) from the primarily floc-settling region 192 of the clarifier to the process zone 156, which may be an aerobic zone. Also, from this line 198 is shown an effluent line 200 (F-WAS) for wasting a portion of the recycle sludge from the clarifier.

The drawing shows a secondary effluent dashed line 201 which may be included from the clarifier's outflow launder back to the sidestream, entering the recycle flow at 176. This is to dilute the sidestream separator feed to provide better separation characteristics. Note that such a dilution line can also be included in the systems described above, such as in FIGS. 4, 5A-5D and 9, to dilute the flow to the separator when needed for optimal granular separation. In all cases, the dilution water could come from another source of clarified water if desired.

It is also possible that the internal recycle of the sidestream could be eliminated in some treatment plants or daily flow conditions. The dilution stream 201 from the clarifier, and/or an increase in the rate of flow from the aerobic zone 156, can be used to increase flow through the sidestream separator 164 as needed to maintain a minimum flow therethrough.

Still further, a dashed line 202 is indicated from the SS effluent line 182, i.e. granular-enriched sludge from the sidestream separator 164. Since the sidestream includes a granular/floc separator, the primarily granular portion can be sent directly back to the anaerobic zone 152, without first going to the clarifier 184. If desired the flow could be divided, according to conditions, to direct a portion of the SS effluent 182 to the clarifier and another portion via the line 202 directly to the anaerobic zone 152 via G-RAS line 203.

Another optional recycle line is shown at 204, indicating that primarily floc recycle sludge in the F-RAS line 198 can be recycled to the anoxic zone (or anoxic/oxic zone) 154, rather than (or in addition to) recycling to the aerobic zone 156. Another dashed line 206 shows a preferred recycle of a portion of the sludge in the aerobic zone back to the anoxic or swing zone 154.

The granular separation system described achieves several advantages. First, it provides two stages of granule/floc separation, so that a better concentration of granular sludge can help all sludge settle more quickly in the clarifier and a higher concentration of granular sludge can be realized at the bottom of the clarifier, at 188. Second, by having a sidestream separator 164, the system provides an early opportunity to collect very light floc and to discharge a desired portion of that floc, as at 186, rather than allowing the lightweight, fluffy material to hinder settling of sludge in the clarifier. Third, the sidestream allows for adjustment of conditions of the incoming mixed liquor for initial startup of the granular/floc separator, which can require dilution to achieve optimum conditions for separation. Fourth, the sidestream provides for the possibility of operation for different conditions and solids retention times for the AGS and floc. The portion of the effluent flow from the aerobic zone 156 to be sent through the sidestream can be adjusted. To avoid significant variations in flow through the separator 164, the pump 168 maintains essentially consistent flow, increasing the internal sidestream recycle to balance lower flow from the line 160 to assure a prescribed range of flow through the separator.

Another aspect of the invention focuses on the anaerobic process zone 152, i.e. the zone which first receives the influent flow 150. See FIG. 13. Pursuant to the invention the anaerobic zone is a multi-stage zone configured to provide an environment to encourage the growth of granules, in further zones downstream. The multi-stage anaerobic zone 152 is designed to create intimate contact of the food-bearing incoming wastewater with the recycled activated sludge entering the anaerobic zone (G-RAS as in FIG. 12), with its granular sludge, and with granular biomass already present in the first anaerobic zone. The influent 150 is rich in readily biodegradable soluble food for the microbes, while the RAS is rich in microbes, as well as in granular biomass. The anaerobic tank and its inflows are configured to encourage further granule growth of sufficient size to provide good separation of granules in the separators downstream. The design encourages a high soluble volumetric BOD loading and also a high food-to-mass (F/M) ratio (mass of BOD applied/mass of MLVSS-day, i.e. mixed liquor volatile suspended solids-day), particularly at the influent end of the zone.

Figure 13:
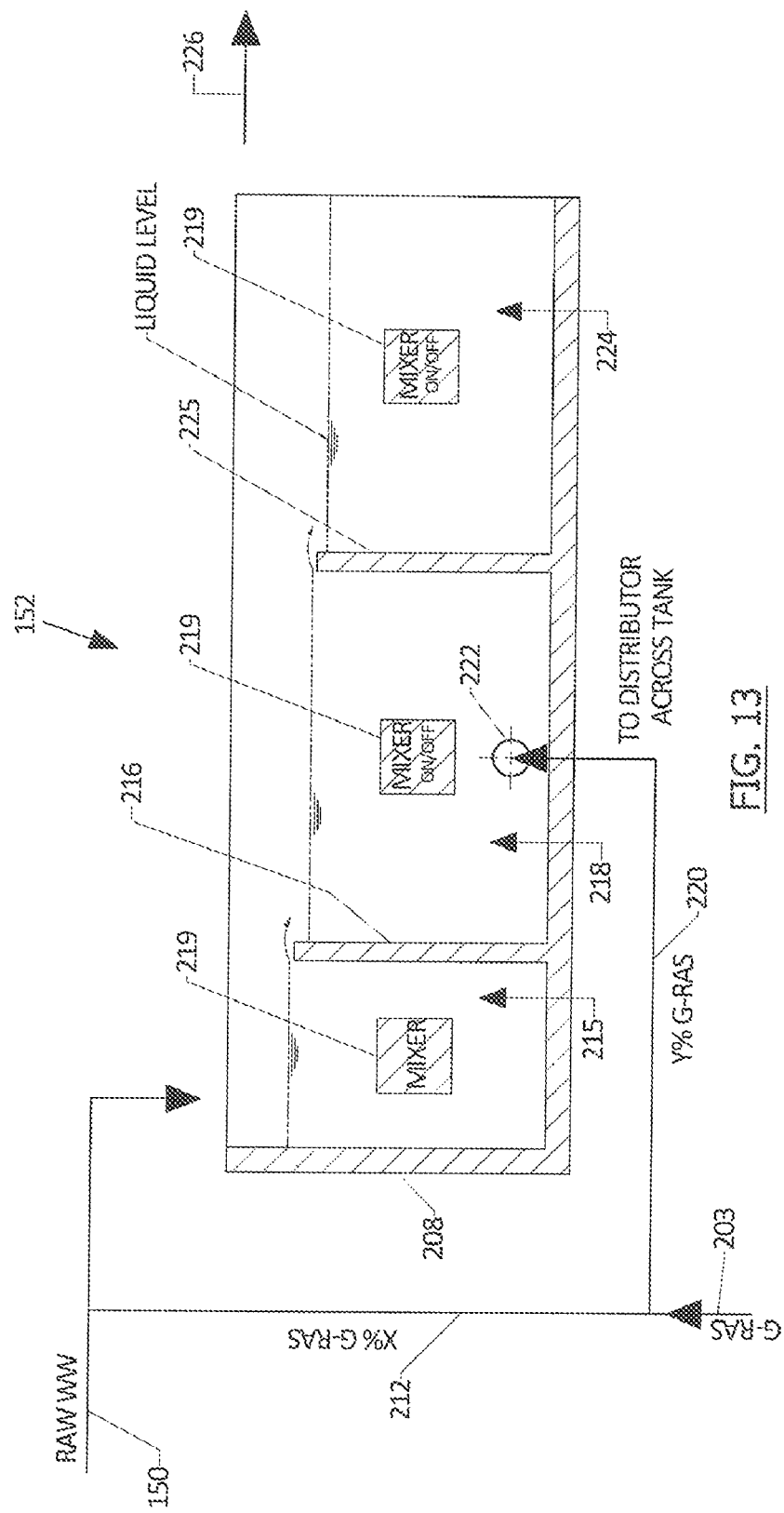
FIG. 13 is an elevational section view showing a multiple-stage anaerobic zone for the system of the invention, to encourage selective growth of granular sludge.

One preferred implementation is shown in FIG. 13. In this embodiment, the anaerobic tank 152 is divided into multiple stages, at least two, with FIG. 13 showing three. Incoming wastewater, which may be raw wastewater, is indicated at the left side of the drawing, at 150, and this is combined with a portion of the G-RAS recycle flow 203 (see FIG. 12). The influent wastewater (line 150) and RAS recycle (line 212) are thoroughly mixed for intimate contact before entry to the stage 215, which would occur in a pipe or a mixing box upstream of or within the anaerobic zone. The RAS portion indicated as 212 in the drawing is a preselected portion of the total RAS flow 203 as further discussed below. Note that the G-RAS in the recycle line 203 could have been treated in a nitrate removal tank (not shown) prior to reaching the anaerobic zone 152.

The influent wastewater and the RAS portion flow into the first stage 215 of the anaerobic zone, which is a small AGS feed stage with retention time preferably 30 minutes or less, possibly only about 15 minutes. From that stage the mixed liquor moves to a second anaerobic zone stage 213, which is shown as by flowing over a weir or baffle 216, although movement to the stage 218 could be other than over a weir.

Mixers 219 in the anaerobic stages allow mixing of the feed with the tank contents for further consumption of readily available soluble food and conversion of colloidal and particulate food to a soluble form for consumption by the microbes.

As noted above, only a selected portion of the RAS is introduced along with the incoming wastewater, at 212/150. The remainder of the RAS portion passes through a line 220, to be introduced into the second stage as illustrated. This is preferably via an appropriate form of distributer, e.g. a horizontal pipe 222 with multiple openings to evenly distribute the RAS across the bottom width of the tank. With a portion of the RAS introduced farther downstream than the influent, the proportions of RAS at 212 and 220 can be adjusted so as to achieve a high F/M ratio, particularly in the first stage 215. In a preferred embodiment the F/M ratio is at least 5 in that first stage 215. This might be achieved using a recycle split with, for example, about 25% to 40% (this could range from 10% to 50%) of the RAS introduced with the influent via the line 212 as a function of the influent wastewater conditions. As note above, the retention time in the first stage is short, no more than 30 minutes.

A third stage 224 is shown in the anaerobic zone in the illustrated embodiment, entering past a divider 225 which can be a weir as shown. An arrow 226 indicates exit flow of MLSS from the third stage 224 and from the anaerobic zone. It should be understood that further anaerobic zones or stages could be included downstream of that shown. Mixers 219 preferably are provided in each stage. In the second and third stages the mixers are turned off periodically. Flow continues through the stages whether the mixers are on or off. In the first stage 215 it is important that all the microbes are in contact for consumption of influent soluble good food at highest F/M ratio, and the mixer need not be shut off. In the second and third stages 218 and 224, mixers are turned off for a selected period of time, greater than one hour, at desired intervals. When the mixer is off heavier solids including granular sludge and unbiodegradable particulate food settle to the bottom of the tank, while the flow in and out of the tank continues to carry lighter solids and smaller granules to the next tank. The solids that settle provide time for intimate contact between the faster settling granular sludge and biodegradable particulate solids.

Under that condition the biodegradable solids from the influent are hydrolyzed, and the hydrolyzed products are fermented to provide additional sbCOD for the granules. During this time the granules are consuming the sbCOD at a deeper biofilm depth and have less competition for the food from flocculent sludge.

The consumed sbCOD (soluble biodegradable COD) in the anaerobic zone is stored as polyhydroxyalkanoates (PHAs) by the bacteria in the granules. During the subsequent mixing period these granules move to the downstream anoxic and aerobic zones where the PHAs are oxidized to result in the growth of new granules to increase the granular sludge biomass content.

Larger granules in a granular/floc activated sludge system have higher settling velocities and thus may be more easily separated from the floc. The size of the granule can be affected by the bulk liquid soluble biodegradable COD (sbCOD) concentration in the anaerobic zone where the influent wastewater and return activated sludge containing granules are first in contact. A higher bulk liquid COD concentration results in a greater diffusion depth for sbCOD into the granule biofilm and thus provides for growth at deeper depths leading to a larger granule. The anaerobic zone in this innovative process design achieves providing a higher sbCOD concentration for granular growth using two features in the first anaerobic stage in the anaerobic zone: 1) a relatively small initial volume in stage 1 to achieve a high soluble BOD loading in g/L-d or high F/M and 2) intimate contact between the granular sludge and particulate BOD during the mixer-off operation.

Terms used herein such as "about" or "generally" should be understood as meaning within 10% of the value stated.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. A wastewater treatment process with a series of process zones including biological process zones, with continuous flow of influent wastewater through the series of zones, a first of the biological process zones being an anaerobic zone for encouraging selective growth of granular biomass, comprising:

providing at least two successive stages in the anaerobic zone, including a first stage and a second stage, into the continuous flow of influent wastewater, introducing a first portion of a recycled activated sludge (RAS) stream from a downstream process zone of the series of process zones to produce a continuous combined raw influent/RAS flow into the first stage, the first stage being of preselected volume, and dwell time in the first stage being no greater than 30 minutes, promoting contact between the influent wastewater, with food, and the RAS, with biological activity, such that granular biomass present in the RAS is exposed to the food of the influent wastewater for consumption and storage leading to growth of granules in further process zones, operating a mixer in the first stage to mix the RAS and incoming wastewater to provide a mixed liquor, moving the mixed liquor in continuous flow to the second stage, introducing to a bottom region of the second stage a second, remaining portion of the RAS to mix with the mixed liquor in the second stage, in the second stage, operating a mixer intermittently such that mixing of the incoming RAS and sludge from the first stage occurs for a time, then the mixer is shut off for a selected period of time whereby heavier granular biomass tends to settle deeper than floc biomass in the second stage, so that said remaining portion of RAS entering the second stage comes into intimate contact with the settled granular biomass and particulate BOD, and the proportions of incoming wastewater and RAS in the first stage being such as to create a food to mass ratio (F/M) of at least 5.

2. The process of claim 1, wherein the second, remaining portion of RAS is introduced into the second stage using a distributor that distributes the incoming RAS essentially uniformly across the width of the second stage and at said bottom region of the second stage.

3. The process of claim 1, including a third stage downstream of the second stage, mixed liquor being moved continuously from the second stage to the third stage.

4. The process of claim 3, including operating a mixer intermittently in the third stage.

5. The process of claim 1, wherein the series of process zones includes at least an aerobic process zone positioned downstream of the anaerobic zone, and including a granular/floc separator downstream of the aerobic process zone, and a clarifier connected to the separator such that the clarifier tends to concentrate granular-rich sludge in a bottom area of the clarifier, with at least a portion of the granular-rich sludge being directed back to the first stage of the anaerobic zone as said RAS.

6. The process of claim 5, wherein the series of biological process zones includes an anoxic zone between the anaerobic and aerobic zones.

7. The process zone of claim 1, wherein said first portion of the RAS is 10% to 50% of the RAS.

8. The process of claim 1, wherein said first portion of the RAS is 25% to 40% of the RAS.

* * * * *